US012764355B2

(12) United States Patent
Wang et al.

(10) Patent No.: US 12,764,355 B2
(45) Date of Patent: Oct. 13, 2026

(54) MULTIMEDIA PROCESSING SYSTEM, MULTIMEDIA PROCESSING METHOD, AND RELATED DEVICE

(71) Applicant: Huawei Cloud Computing Technologies Co., Ltd., Guizhou (CN)

(72) Inventors: Lijie Wang, Suzhou (CN); Chunrong Tong, Hangzhou (CN); Tao Liao, Suzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 19/229,146

(22) Filed: Jun. 5, 2025

(65) Prior Publication Data

US 2025/0301190 A1 Sep. 25, 2025

Related U.S. Application Data

(63) Continuation of application No. PCT/CN2023/124244, filed on Oct. 12, 2023.

(30) Foreign Application Priority Data

Dec. 5, 2022 (CN) ......................... 202211550563.9
Feb. 8, 2023 (CN) ......................... 202310084296.9

(51) Int. Cl.
*H04N 21/2343* (2011.01)
*H04N 21/2187* (2011.01)

(52) U.S. Cl.
CPC . *H04N 21/234363* (2013.01); *H04N 21/2187* (2013.01)

(58) Field of Classification Search
CPC ....... H04N 21/234363; H04N 21/2187; H04N 7/147; H04N 21/23439; H04N 21/2393;
(Continued)

(56) References Cited

U.S. PATENT DOCUMENTS 10,999,344 B1 * 5/2021 Babkin ................. H04L 65/403
11,196,963 B1 12/2021 Dipasquale et al.
(Continued)

FOREIGN PATENT DOCUMENTS

CN 109788314 A 5/2019
CN 113163214 A 7/2021

*Primary Examiner* — Oschta I Montoya
(74) *Attorney, Agent, or Firm* — Conley Rose, P.C.

(57) ABSTRACT

A multimedia processing system communicates with a plurality of terminal devices and includes a forwarding apparatus and an adaptation apparatus. The forwarding apparatus is configured to receive a first video stream with a first resolution from a first terminal device. The adaptation apparatus is configured to generate a second video stream with a second resolution based on the first video stream. The second resolution is greater than the first resolution. The forwarding apparatus is further configured to send the second video stream to a second terminal device. Both the first terminal device and the second terminal device access a same video application. In this way, even if computing power of the first terminal device is low, the second terminal device can still obtain the second video stream with the higher resolution through resolution conversion performed by the multimedia processing system on the video stream.

16 Claims, 7 Drawing Sheets

(58) Field of Classification Search
CPC ........... H04N 21/4312; H04N 21/4788; H04N 21/4858
See application file for complete search history.

(56) References Cited

U.S. PATENT DOCUMENTS

| | | | | |
|---|---|---|---|---|
| 11,363,282 | B1 * | 6/2022 | Christofferson | H04N 19/13 |
| 11,457,054 | B2 * | 9/2022 | Soroushian | H04N 19/33 |
| 2020/0169766 | A1 * | 5/2020 | Chirokov | H04N 21/816 |
| 2022/0329883 | A1 * | 10/2022 | Stokking | H04N 21/2353 |

* cited by examiner

MULTIMEDIA PROCESSING SYSTEM, MULTIMEDIA PROCESSING METHOD, AND RELATED DEVICE

CROSS-REFERENCE TO RELATED APPLICATIONS

This is a continuation of International Patent Application No. PCT/CN2023/124244 filed on Oct. 12, 2023, which claims priority to Chinese Patent Application No. 202211550563.9 filed on Dec. 5, 2022 and Chinese Patent Application No. 202310084296.9 filed on Feb. 8, 2023. All of the aforementioned patent applications are hereby incorporated by reference in their entireties.

TECHNICAL FIELD

This application relates to the field of multimedia technologies, and in particular, to a multimedia processing system, a multimedia processing method, and a related device.

BACKGROUND

Currently, different users can usually use terminal devices for cloud video conferencing or video livestreaming. Further, video software such as cloud video conferencing and video livestreaming can usually be deployed on a terminal device of a user. Therefore, the user can use the video software on the terminal device to generate a video and send the video to a terminal device of another user, to have a cloud video conference with another user or view livestreaming video content of another user.

However, in an actual application scenario, terminal devices of most users usually have low computing power, and other software run on the terminal devices also consumes the computing power of the terminal devices. Consequently, computing power allocated by the terminal devices to video software is usually low, affecting video interaction experience between different users. For example, when a user A and a user B use a terminal device a and a terminal device b for cloud video conferencing, because computing power of the terminal device a is low, a maximum resolution of a conference video viewed by the user A on the terminal device a can only reach 360 progressive (P), and definition of a video image is poor. Consequently, the user A has poor user experience during the cloud video conferencing with the user B.

SUMMARY

In view of this, embodiments of this application provide a multimedia processing system, to improve user experience of different users using terminal devices for video interaction. This application further provides a corresponding multimedia processing method, a computing device cluster, a computer-readable storage medium, and a computer program product.

According to a first aspect, an embodiment of this application provides a multimedia processing system. The multimedia processing system communicates with a plurality of terminal devices, the plurality of terminal devices includes a first terminal device and a second terminal device, and both the first terminal device and the second terminal device access a same video application, so that different terminal devices can perform video stream interaction based on the video application, to implement a function such as video livestreaming or video conferencing. The multimedia processing system includes a forwarding apparatus and an adaptation apparatus. During actual application, the multimedia processing system may further include an apparatus having more functions, such as a control apparatus. The forwarding apparatus is configured to receive a first video stream from the first terminal device. A resolution of the first video stream is a first resolution. The adaptation apparatus is configured to generate a second video stream based on the first video stream. A resolution of the second video stream is a second resolution, and the second resolution is greater than the first resolution. For example, the second resolution is 1080P, and the first resolution is 720P. The forwarding apparatus is further configured to send the second video stream to the second terminal device based on a request of the second terminal device for a video stream. In this way, when video content is consistent, the second terminal device can obtain a video stream with a higher resolution.

When different terminal devices perform video interaction, the multimedia processing system can generate the second video stream with the higher resolution based on the first video stream sent by the first terminal device, and send the second video stream to the second terminal device. Therefore, when computing power of the first terminal device is low, the second terminal device can still obtain the second video stream with the higher resolution. This can avoid a problem of a low resolution of a video stream received by the second terminal device caused by the limited computing power of the first terminal device, so that user experience of a plurality of users using terminal devices for video interaction can be improved.

In a possible implementation, the plurality of terminal devices further includes a third terminal device and a fourth terminal device. The forwarding apparatus is further configured to receive a third video stream from the third terminal device. A resolution of the third video stream may be the same as or different from the resolution of the first video stream. The adaptation apparatus is further configured to perform video composition based on the first video stream and the third video stream to obtain a composite video stream. The forwarding apparatus is further configured to send the composite video stream to the fourth terminal. In this way, the multimedia processing system can perform composition on video streams of a plurality of other terminal devices for the fourth terminal device, to avoid adverse impact on multi-image presentation on the fourth terminal device caused by limited computing power of the fourth terminal device or a limited condition of network transmission.

In a possible implementation, when generating the second video stream, the adaptation apparatus further generates a plurality of video streams based on the first video stream of the first terminal device. The plurality of video streams includes the second video stream, and resolutions of different video streams in the plurality of video streams are different. For example, the adaptation apparatus may generate a plurality of video streams with different resolutions such as 360P, 720P, and 1080P based on the first video stream with the resolution of 180P. In this way, the multimedia processing system can meet, based on the plurality of video streams with the different resolutions, requirements of different terminal devices for video streams with different resolutions of the first terminal device.

In a possible implementation, the multimedia processing system further includes a control apparatus. The control apparatus is configured to receive a selection and viewing request for the first terminal device sent by the second terminal device. The selection and viewing request include a resolution identifier, and the resolution identifier indicates that a resolution of a video stream selected by the second terminal device for viewing is the second resolution. In this case, when generating the second video stream, the adaptation apparatus further obtains the resolution identifier. For example, the resolution identifier may be sent by the control apparatus to the adaptation apparatus. In addition, when the first resolution does not match the resolution identifier, the adaptation apparatus generates the second video stream based on the first video stream. In this way, the multimedia processing system can adaptively generate the video stream with the second resolution based on a requirement of the second terminal device for a resolution of a video stream, to meet the requirement of the second terminal device for the video stream.

In a possible implementation, the video application accessed by the first terminal device and the second terminal device is a video conferencing application or a video livestreaming application. In this way, different users can use the video application on the first terminal device and the second terminal device to implement a function such as video conferencing or video livestreaming.

In a possible implementation, the multimedia processing system further includes the control apparatus. The control apparatus is configured to receive a first video stream composition request sent by the fourth terminal. The first video stream composition request includes an identifier of a target image display mode and a quantity of a plurality of video streams participating in composition, and the target image display mode indicates display areas of the plurality of video streams in a video image. In this case, when composing the video stream, the adaptation apparatus further receives a first control instruction of the control apparatus, where the first control instruction includes the quantity of the plurality of video streams participating in the composition, the image display mode, and indication information of a composition operation; and performs video composition on the first video stream and the third video stream according to the first control instruction to obtain the composite video stream. In this way, the adaptation apparatus can implement video composition on the plurality of video streams under the control of the control apparatus, so that the fourth terminal obtains a required composite video stream, to avoid adverse impact on multi-image presentation on the fourth terminal device caused by limited computing power of the fourth terminal device or a limited condition of network transmission.

In a possible implementation, the control apparatus is further configured to obtain a plurality of image display modes before receiving the first video stream composition request, for example, obtain the plurality of image display modes by reading a configuration file. The plurality of image display modes includes the target image display mode. In this way, a degree of freedom for a user to select an image display mode can be increased, so that user experience is improved. Alternatively, the control apparatus obtains custom information for the target image display mode before receiving the first video stream composition request. For example, the custom information may be provided by a user to the multimedia processing system. The custom information indicates user-defined display areas of the plurality of video streams in the video image. In this way, the user can customize the target image display mode.

In a possible implementation, the multimedia processing system further includes the control apparatus. The control apparatus is configured to receive a second video stream composition request sent by the fourth terminal. The second video stream composition request includes indication information of a composition operation, and coordinates of a key point, a length, and a width that correspond to a display area of each video stream participating in composition in a video image. In this case, when composing the video stream, the adaptation apparatus further receives a second control instruction of the control apparatus, where the second control instruction includes the coordinates of the key point, the length, and the width that correspond to the display area of each video stream participating in the composition in the video image; and the adaptation apparatus performs video composition on the first video stream and the third video stream according to the second control instruction to obtain the composite video stream. In this way, the adaptation apparatus can implement video composition on the plurality of video streams under the control of the control apparatus, so that the fourth terminal obtains a required composite video stream, to avoid adverse impact on multi-image presentation on the fourth terminal device caused by limited computing power of the fourth terminal device or a limited condition of network transmission.

In a possible implementation, the multimedia processing system further includes the control apparatus. The control apparatus is configured to determine a plurality of resolutions supported by the multimedia processing system, where the plurality of resolutions include the first resolution and the second resolution; and the control apparatus sends the plurality of resolutions to the second terminal device. In this way, the second terminal device can learn of a plurality of resolutions supported for a video stream obtained by the second terminal device, so that one or more resolutions are subsequently specified from the plurality of resolutions, to obtain a video stream with the resolution.

According to a second aspect, this application provides a multimedia processing system. The multimedia processing system includes a forwarding apparatus and an adaptation apparatus, and the multimedia processing system communicates with a second terminal device and a plurality of terminal devices. The forwarding apparatus is configured to receive a plurality of video streams. The plurality of video streams is from a plurality of first terminal devices. The adaptation apparatus is configured to perform composition on the plurality of video streams to obtain a composite video stream. The forwarding apparatus is further configured to send the composite video stream to the second terminal device based on a request of the second terminal device for a composite video stream. In this way, the multimedia processing system can perform composition on video streams of a plurality of other terminal devices for the second terminal device, to avoid adverse impact on multi-image presentation on the second terminal device caused by limited computing power of the second terminal device or a limited condition of network transmission.

According to a third aspect, this application provides a multimedia processing method. The method is applied to a multimedia processing system, the multimedia processing system communicates with a plurality of terminal devices, and the plurality of terminal devices include a first terminal device and a second terminal device. The method includes that the multimedia processing system receives a first video stream from the first terminal device, where a resolution of the first video stream is a first resolution. The multimedia processing system generates a second video stream based on the first video stream, where a resolution of the second video stream is a second resolution, and the second resolution is greater than the first resolution. The multimedia processing system sends the second video stream to the second terminal device based on a request of the second terminal device for a video stream, where both the first terminal device and the second terminal device access a same video application.

In a possible implementation, the plurality of terminal devices further includes a third terminal device and a fourth terminal device. The method further includes: The multimedia processing system receives a third video stream from the third terminal device. The multimedia processing system performs video composition based on the first video stream and the third video stream to obtain a composite video stream. The multimedia processing system sends the composite video stream to the fourth terminal.

In a possible implementation, that the multimedia processing system generates the second video stream based on the first video stream includes that the multimedia processing system generates a plurality of video streams based on the first video stream, where the plurality of video streams includes the second video stream, and resolutions of different video streams in the plurality of video streams are different.

In a possible implementation, the method further includes that the multimedia processing system receives a selection and viewing request for the first terminal device sent by the second terminal device, where the selection and viewing request includes a resolution identifier, and the resolution identifier indicates that a resolution of a video stream selected by the second terminal device for viewing is the second resolution. That the multimedia processing system generates the second video stream based on the first video stream includes that the multimedia processing system obtains the resolution identifier, and generates the second video stream based on the first video stream when the first resolution does not match the resolution identifier.

In a possible implementation, the video application is a video conferencing application or a video livestreaming application.

In a possible implementation, the method further includes that the multimedia processing system receives a first video stream composition request sent by the fourth terminal, where the first video stream composition request includes an identifier of a target image display mode and a quantity of a plurality of video streams participating in composition, and the target image display mode indicates display areas of the plurality of video streams in a video image. The multimedia processing system performs video composition based on the first video stream and the third video stream to obtain the composite video stream includes that the multimedia processing system obtains a first control instruction, where the first control instruction includes the quantity of the plurality of video streams participating in the composition, the image display mode, and indication information of a composition operation. The multimedia processing system performs video composition on the first video stream and the third video stream according to the first control instruction to obtain the composite video stream.

In a possible implementation, the method further includes that the multimedia processing system obtains a plurality of image display modes before receiving the first video stream composition request, where the plurality of image display modes include the target image display mode. Alternatively, the multimedia processing system obtains custom information for the target image display mode before receiving the first video stream composition request, where the custom information indicates user-defined display areas of the plurality of video streams in the video image.

In a possible implementation, the method further includes that the multimedia processing system receives a second video stream composition request sent by the fourth terminal, where the second video stream composition request includes indication information of a composition operation, and coordinates of a key point, a length, and a width that correspond to a display area of each video stream participating in composition in a video image. The multimedia processing system performs video composition based on the first video stream and the third video stream to obtain the composite video stream includes that the multimedia processing system obtains a second control instruction, where the second control instruction includes the coordinates of the key point, the length, and the width that correspond to the display area of each video stream participating in the composition in the video image. The multimedia processing system performs video composition on the first video stream and the third video stream according to the second control instruction to obtain the composite video stream.

In a possible implementation, the method further includes that the multimedia processing system determines a plurality of resolutions supported by the multimedia processing system, where the plurality of resolutions include the first resolution and the second resolution. The multimedia processing system sends the plurality of resolutions to the second terminal device.

It should be noted that the multimedia processing method provided in the third aspect corresponds to the multimedia processing system provided in the first aspect. Therefore, for technical effects of the third aspect or any implementation of the third aspect, refer to technical effects of the first aspect or a corresponding implementation of the first aspect.

According to a fourth aspect, this application provides a multimedia processing method. The method is applied to a multimedia processing system, and the multimedia processing system communicates with a second terminal device and a plurality of terminal devices. The method includes that the multimedia processing system receives a plurality of video streams, where the plurality of video streams is from a plurality of first terminal devices. The multimedia processing system performs composition on the plurality of video streams to obtain a composite video stream. The multimedia processing system sends the composite video stream to the second terminal device based on a request of the second terminal device for a composite video stream.

It should be noted that the multimedia processing method provided in the fourth aspect corresponds to the multimedia processing system provided in the second aspect. Therefore, for technical effects of an implementation of the fourth aspect, refer to technical effects of a corresponding implementation of the second aspect.

According to a fifth aspect, this application provides a computing device cluster. The computing device cluster includes at least one computing device, the at least one computing device includes at least one processor and at least one memory, the at least one memory is configured to store instructions, and the at least one processor executes the instructions stored in the at least one memory, to enable the computing device cluster to perform the data processing method in the third aspect or any possible implementation of the third aspect, or perform the data processing method in the fourth aspect or any possible implementation of the fourth aspect. It should be noted that, the memory may be integrated into the processor, or may be independent of the processor. The at least one computing device may further include a bus. The processor is connected to the memory through the bus. The memory may include a readable memory and a random access memory.

According to a sixth aspect, this application provides a computer-readable storage medium. The computer-readable storage medium stores instructions. When the instructions are run on at least one computing device, the at least one computing device is enabled to perform the method in the third aspect or any implementation of the third aspect, or perform the data processing method in the fourth aspect or any possible implementation of the fourth aspect.

According to a seventh aspect, this application provides a computer program product including instructions. When the computer program product is run on at least one computing device, the at least one computing device is enabled to perform the method in the third aspect or any implementation of the third aspect, or perform the data processing method in the fourth aspect or any possible implementation of the fourth aspect.

In this application, on the basis of the implementations provided in the foregoing aspects, the implementations may be further combined to provide more implementations.

BRIEF DESCRIPTION OF DRAWINGS

To describe technical solutions in embodiments of this application more clearly, the following briefly describes accompanying drawings used for describing embodiments. It is clear that the accompanying drawings in the following descriptions show merely some embodiments of this application, and a person of ordinary skill in the art may still derive other drawings from these accompanying drawings.

DESCRIPTION OF EMBODIMENTS

The following describes the solutions in embodiments provided in this application with reference to the accompanying drawings in this application.

In the specification, claims, and accompanying drawings of this application, the terms "first", "second", and the like are intended to distinguish between similar objects but do not necessarily indicate a specific order or sequence. It should be understood that terms used in such a way are interchangeable in proper circumstances, and this is merely a discrimination manner for describing objects having a same attribute in embodiments of this application.

Figure 1:
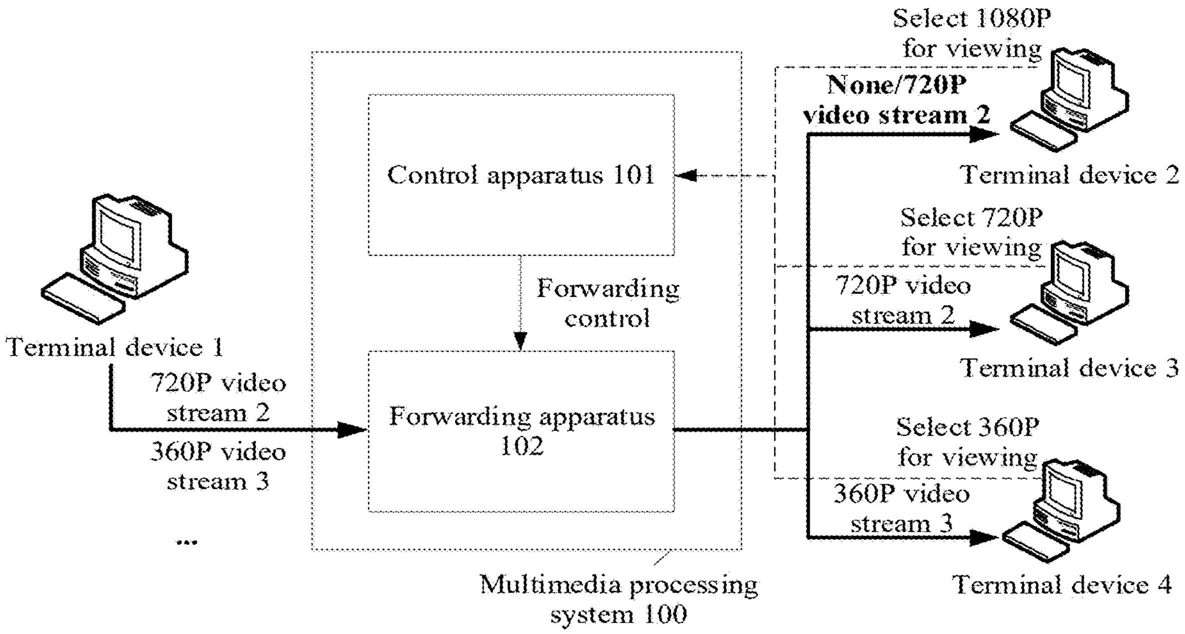
FIG. 1 is a diagram of a structure of a multimedia processing system.

FIG. 1 is a diagram of an example of a structure of a multimedia processing system. As shown in FIG. 1, a multimedia processing system 100 includes a control apparatus 101 and a forwarding apparatus 102. The control apparatus 101 and the forwarding apparatus 102 may be in a communication connection to each other through a wired or wireless network.

The multimedia processing system 100 may be connected to a plurality of terminal devices. In FIG. 1, an example in which the multimedia processing system 100 is connected to a terminal device 1, a terminal device 2, a terminal device 3, and a terminal device 4 is used for description. In an actual application scenario, there may be any quantity of terminal devices accessing the multimedia processing system 100. This is not limited herein.

In a scenario such as cloud video conferencing or video livestreaming, the terminal device 2, the terminal device 3, and the terminal device 4 may need to obtain a video generated by the terminal device 1 (to present content of the video of the terminal device 1 to a corresponding user), and different terminal devices may need to obtain videos with different resolutions generated by the terminal device 1, as shown in FIG. 1. In this case, the terminal device 1 to the terminal device 4 may all access a same video application, for example, a video conferencing application or a video livestreaming application, and different terminal devices that access the same video application may perform video stream interaction. The terminal device 2 requests a video stream 1 with a resolution of 1080P from the control apparatus 101, the terminal device 3 requests a video stream 2 with a resolution of 720P from the control apparatus 101, and the terminal device 4 requests a video stream 3 with a resolution of 360P from the control apparatus 101. If computing power of the terminal device 1 is sufficient, the terminal device 1 sends, to the multimedia processing system 100, a video stream 1, a video stream 2, and a video stream 3 that are generated in real time, and the forwarding apparatus 102 in the multimedia processing system 100 may respectively forward the video stream 1, the video stream 2, and the video stream 3 to the corresponding terminal device 2, the corresponding terminal device 3, and the corresponding terminal device 4 under the control of the control apparatus 101.

However, in an actual application scenario, computing power of the terminal device 1 is usually limited, and other software run on the terminal device 1 also consumes the computing power of the terminal device 1. Consequently, it is difficult for the terminal device 1 to simultaneously generate a plurality of video streams with different resolutions. For example, current computing power of the terminal device 1 can only support simultaneous generation of the video stream 2 with the resolution of 720P and the video stream 3 with the resolution of 360P, but cannot support simultaneous generation of the video stream 1 with the resolution of 1080P. Consequently, it is difficult for the terminal device 2 to obtain the video stream 1 with the resolution of 1080P, or the terminal device 2 can obtain the video stream 2 with the resolution of 720P from the forwarding apparatus 102 at most, which cannot meet a requirement of the terminal device 2 for the video stream with the resolution of 1080P. In addition, a bandwidth allocated when the terminal device 1 and the multimedia processing system 100 establish a communication connection is usually limited, or problems such as a packet loss, a high delay, and an increase in jitter are likely to occur in a network transmission process. This also makes it difficult for the terminal device 1 to simultaneously send the video stream 1 with the resolution of 1080P, the video stream 2 with the resolution of 720P, and the video stream 3 with the resolution of 360P to the multimedia processing system 100.

In this case, when a plurality of users uses terminal devices for video interaction, due to limited computing power of the terminal device or limited network transmission between the terminal device and the multimedia processing system 100, some users cannot view a video, or a resolution of a viewed video is low (in other words, definition of a video image is poor), affecting video interaction experience between different users.

Figure 2:
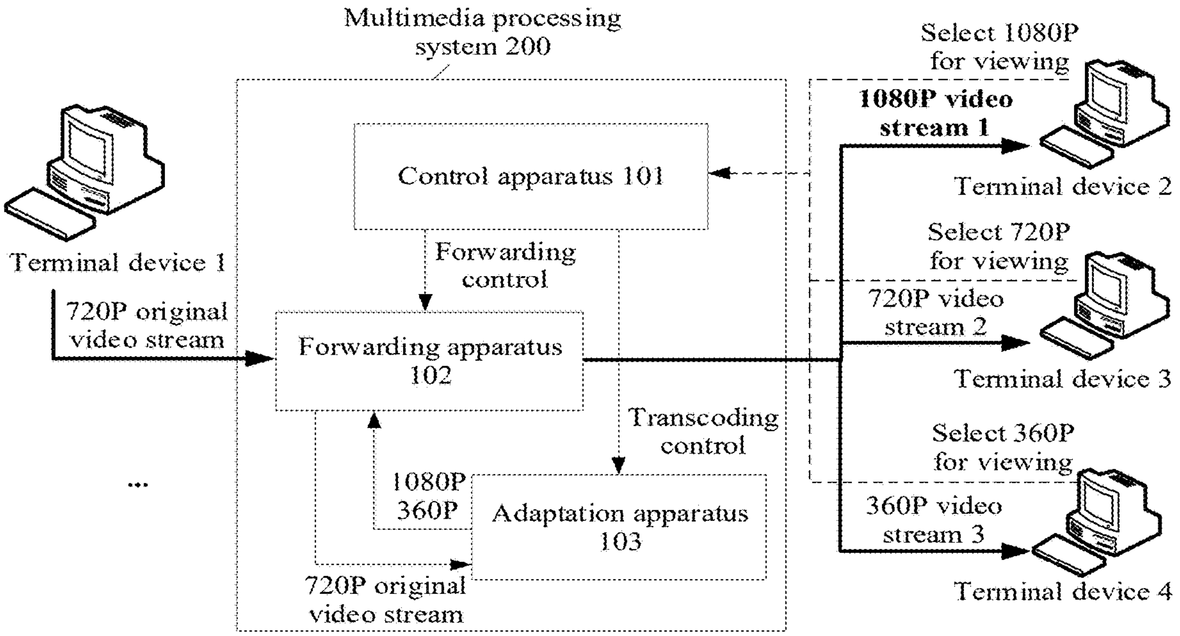
FIG. 2 is a diagram of an example of a structure of a multimedia processing system according to this application.

Based on this, this application provides a new multimedia processing system, as shown in FIG. 2. On the basis of the multimedia processing system 100 shown in FIG. 1, an adaptation apparatus 103 is added to a multimedia processing system 200 shown in FIG. 2. In addition, a control apparatus 101, a forwarding apparatus 102, and the adaptation apparatus 103 may be in a communication connection to each other through a wired or wireless network.

An example in which a terminal device 1 provides another terminal with a video stream is still used. The terminal device 1 may generate an original video stream with a resolution of 720P and send the original video stream to the multimedia processing system 200 based on computing power of the terminal device 1 or a condition of network transmission between the terminal device 1 and the multimedia processing system 200.

After receiving the original video stream, the forwarding apparatus 102 in the multimedia processing system 200 may provide the original video stream to the adaptation apparatus 103. In addition, the control apparatus 101 may send, to the adaptation apparatus 103 according to requirements of a terminal device 2 to a terminal device 4 for a resolution of a video stream, a control instruction for transcoding the original video stream. In this case, under the control of the control apparatus 101, the adaptation apparatus 103 generates a video stream 1 with a resolution of 1080P and a video stream 3 with a resolution of 360P based on the original video stream with the resolution of 720P, uses the original video stream as a video stream 2, and provides the video stream 1 and the video stream 3 to the forwarding apparatus 102. After the adaptation apparatus 103 generates a plurality of video streams, the control apparatus 101 may control the forwarding apparatus 102 to forward the plurality of video streams, so that the forwarding apparatus 102 forwards the video stream 1 to the terminal device 2, the video stream 2 to the terminal device 3, and the video stream 3 to the terminal device 4 under the control of the control apparatus 101. In this way, the terminal device 2 to the terminal device 4 obtain required video streams respectively.

In a process of video interaction between different terminal devices, the multimedia processing system 200 can generate, based on the original video stream sent by the terminal device 1, video streams with other resolutions, including the video stream 1 with the higher resolution and the video stream 3 with the lower resolution, and send the video streams to corresponding terminal devices. In this way, when the computing power of the terminal device 1 is low, another terminal device can still obtain a video stream with another resolution, so that user experience of a plurality of users using terminal devices for video interaction can be improved. For example, the multimedia processing system 200 converts a resolution of a video stream, to avoid a problem of a low resolution of a video stream received by another terminal device caused by the limited computing power of the terminal device, so that another user can view a video with higher definition. Even if the terminal device 2 requires a video stream with 4K (which means a quantity of pixels in each row in a horizontal direction of a video image reaches or approaches 4096) or a higher resolution, the multimedia processing system 200 can still meet the requirement of the terminal device 2 through video transcoding.

In addition, even if the condition of the network transmission between the terminal device 1 and the multimedia processing system 200 is limited, because the multimedia processing system 200 may obtain one or more video streams with other resolutions through conversion based on a resolution of a received video stream, the terminal device 1 may transmit only a small quantity of video streams with low resolutions (for example, a video stream with a resolution of 360P). This can also provide one or more other terminal devices with a video stream required by the terminal devices, to avoid, as much as possible, adverse impact on user experience of a plurality of users in video interaction caused by the limited condition of network transmission between the terminal device 1 and the multimedia processing system 200.

In an example, the multimedia processing system 200 may be deployed on a cloud, and is configured to provide a plurality of different terminal devices with a cloud service for processing a video stream. In this case, the control apparatus 101, the forwarding apparatus 102, and the adaptation apparatus 103 in the multimedia processing system 200 may be separately implemented by a computing device or a computing device cluster on the cloud, or the control apparatus 101, the forwarding apparatus 102, and the adaptation apparatus 103 may be deployed on a same computing device or deployed in a same computing device cluster.

In another example, the multimedia processing system 200 may be deployed locally, to provide a plurality of different terminal devices with a local service for processing a video stream.

During actual application, the control apparatus 101, the forwarding apparatus 102, and the adaptation apparatus 103 in the multimedia processing system 200 may be separately implemented by software or hardware.

The adaptation apparatus 103 is used as an example. In an example in which the adaptation apparatus 103 is a software functional unit, the adaptation apparatus 103 may include code run on a computing instance. The computing instance may include at least one of a host, a virtual machine, a container, a thread, or a process. Further, there may be one or more computing instances. For example, the adaptation apparatus 103 may include code run on a plurality of hosts/virtual machines/containers. It should be noted that, the plurality of hosts/virtual machines/containers configured to run the code may be distributed in a same region, or may be distributed in different regions. Further, the plurality of hosts/virtual machines/containers configured to run the code may be distributed in a same availability zone (AZ), or may be distributed in different AZs. Each AZ includes one data center or a plurality of data centers that are geographically close to each other. Generally, one region may include a plurality of AZs.

Similarly, the plurality of hosts/virtual machines/containers configured to run the code may be distributed on a same virtual private cloud (VPC), or may be distributed on a plurality of VPCs. Generally, one VPC is set in one region. A communication gateway needs to be set in each VPC for communication between two VPCs in a same region and cross-region communication between VPCs in different regions. The VPCs are interconnected through the communication gateway.

In an example in which the adaptation apparatus 103 is a hardware functional unit, the adaptation apparatus 103 may include at least one computing device, for example, a cloud server. Alternatively, the adaptation apparatus 103 may be a device implemented by using an application-specific integrated circuit (ASIC) or a programmable logic device (PLD), or the like. The PLD may be implemented by a complex programmable logic device (CPLD), a field-programmable gate array (FPGA), generic array logic (GAL), a data processing unit (DPU), or any combination thereof.

When the adaptation apparatus 103 may include a plurality of computing devices, the plurality of computing devices may be distributed in a same region, or may be distributed in different regions. The plurality of computing devices included in the adaptation apparatus 103 may be distributed in a same AZ, or may be distributed in different AZs. Similarly, the plurality of computing devices included in the adaptation apparatus 103 may be distributed on a same VPC, or may be distributed on a plurality of VPCs. The plurality of computing devices may be any combination of computing devices such as a server, an ASIC, a PLD, a CPLD, an FPGA, and a GAL.

Similar to the adaptation apparatus 103, when implemented by software, both the forwarding apparatus 102 and the control apparatus 101 may be code run on a computing instance; or when implemented by hardware, both the forwarding apparatus 102 and the computing apparatus 101 may include one or more computing devices.

It should be noted that the multimedia processing system 200 shown in FIG. 2 is merely an example for description. During actual application, the multimedia processing system 200 may have another implementation. For example, the multimedia processing system 200 may include more functional modules to support the multimedia processing system 200 in having another function. Alternatively, the control apparatus 101 and the forwarding apparatus 102 may be integrated into one apparatus. In other words, the integrated apparatus has both a control function and a function of forwarding a video stream. Alternatively, the control apparatus 101 and the adaptation apparatus 103 may be integrated into one apparatus, or the like. This is not limited herein.

For ease of understanding, the following describes in detail various non-limiting specific implementations of processing and forwarding a video stream in the multimedia processing system 200.

Figure 3:
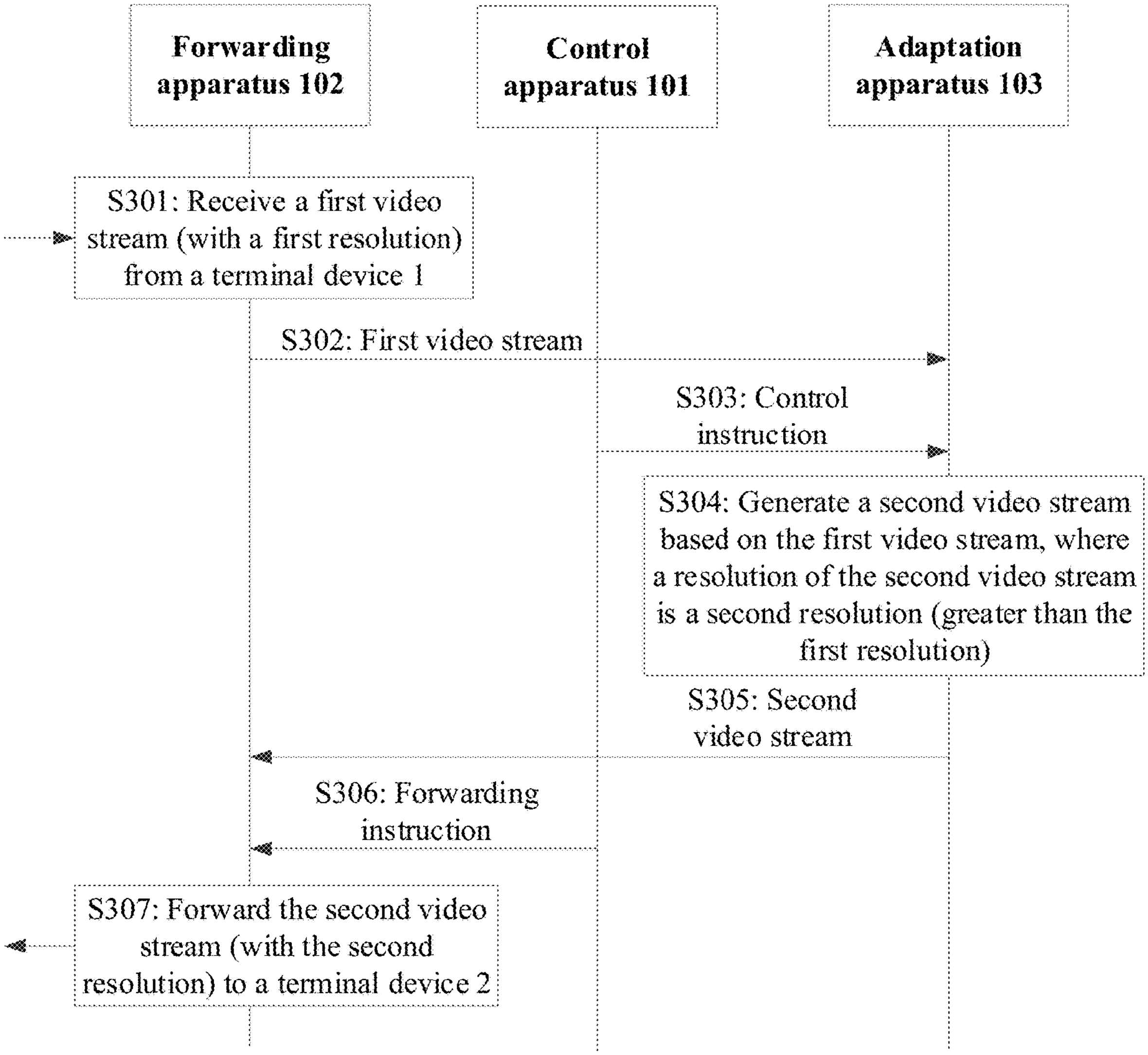
FIG. 3 is a schematic flowchart of a multimedia processing method according to this application.

FIG. 3 is a schematic flowchart of a multimedia processing method according to an embodiment of this application. The method may be applied to the multimedia processing system 200 shown in FIG. 2, or may be applied to another applicable application scenario. An example in which the method is applied to the multimedia processing system 200 shown in FIG. 2 is used below to describe a process of converting a video stream sent by the terminal device 1 into a video stream required by the terminal device 2.

The multimedia processing method shown in FIG. 3 may specifically include the following steps.

S301: The forwarding apparatus 102 receives a first video stream from the terminal device 1, where a resolution of the first video stream is a first resolution.

In this embodiment, the terminal device 1 and the terminal device 2 may pre-access a same video application, for example, a video conferencing application or a video livestreaming application, so that the two terminal devices perform video stream interaction based on the video application. During actual application, in a scenario such as cloud video conferencing or video livestreaming, the terminal device 1 may generate the first video stream, for example, may generate the first video stream based on the video application. The first video stream may be a conference video stream obtained by photographing a user 1 (to which the terminal device 1 belongs) in real time in the cloud video conferencing scenario, or may be a livestreaming video stream obtained by photographing a livestreaming user or a livestreaming scene in real time in the video livestreaming scenario.

In an implementation example, when the user 1 uses the terminal device 1 for cloud video conferencing or video livestreaming, the terminal device 1 may photograph the user 1, for example, may perform photographing by using an image shooting apparatus such as a camera, to generate the first video stream. The terminal device 1 may select, based on currently available computing power or a currently available bandwidth of the terminal device 1, the first resolution that conforms to the available computing power or the available bandwidth, for example, select a resolution of 720P, and generate the first video stream whose resolution is the first resolution. Then, the terminal device 1 may send the first video stream to the multimedia processing system 200, so that the multimedia processing system 200 subsequently provides, to another terminal device based on the first video stream, a video stream required by the other terminal device. When sending the first video stream to the multimedia processing system 200, the terminal device 1 may further send a unique identifier of the terminal device 1 (namely, an identifier of a source device) and related information of the first video stream. The related information of the first video stream may be, for example, information such as a payload type (PT) and a synchronization source (SSRC) identifier that correspond to the first video stream, and an identifier of the first video stream.

When the terminal device 1 is to send the video stream to the multimedia processing system 200, a receiving node may be created in the forwarding apparatus 102. The receiving node may be implemented by using a thread, a process, or the like, so that the forwarding apparatus 102 can receive, by using the receiving node, the first video stream (and the unique identifier of the terminal device 1 and the related information of the first video stream) sent by the terminal device 1, and store the first video stream in the forwarding apparatus 102.

For example, an interface 1 may be configured on the forwarding apparatus 102, and the control apparatus 101 may pre-invoke the interface 1, to create, in the forwarding apparatus 102, the receiving node configured to receive the first video stream of the terminal device 1. An interface parameter for the control apparatus 101 to invoke the interface 1 may include an identifier of a source device, namely, an identifier of the terminal device 1 (which may be allocated by the control apparatus 101 when the terminal device 1 joins cloud conferencing). In addition, the interface parameter may further include a local Internet Protocol (IP) address, a port number, a used network transmission protocol, and related information of the video stream that are for the forwarding apparatus 102 to receive the first video stream. The used network transmission protocol may be, for example, a User Datagram Protocol (UDP) or a Transmission Control Protocol (TCP).

S302: The forwarding apparatus 102 provides the first video stream to the adaptation apparatus 103.

The forwarding apparatus 102 may provide the first video stream to the adaptation apparatus 103 based on a wired connection or a wireless connection between the forwarding apparatus 102 and the adaptation apparatus 103.

S303: The control apparatus 101 sends a control instruction to the adaptation apparatus 103, where the control instruction instructs the adaptation apparatus 103 to convert the first video stream sent by the terminal device 1.

S304: The adaptation apparatus 103 generates a second video stream based on the first video stream according to the control instruction, where a resolution of the second video stream is a second resolution, and the second resolution is greater than the first resolution.

In this embodiment, a resolution (namely, the second resolution) of the video stream required by the terminal device 2 is high, but computing power of the terminal device 1 or a condition of network transmission is limited, and it is difficult to provide a high-resolution video stream. In this case, the adaptation apparatus 103 may generate the second video stream with the higher resolution based on the first video stream with the lower resolution under the control of the control apparatus 101.

During specific implementation, after obtaining a plurality of data packets that carry the first video stream, the adaptation apparatus 103 may perform pre-decoding processing on the plurality of data packets, for example, perform an integrity check on the first video stream, and sort and assemble video stream segments carried in the plurality of data packets. Then, the adaptation apparatus 103 may decode data obtained through the pre-decoding processing, and may obtain a data stream in a YUV format (a color coding format) or another format. Next, the adaptation apparatus 103 may perform, based on the second resolution, corresponding scaling on the data stream obtained through the decoding, so that the adaptation apparatus 103 encodes a scaled data stream, to obtain the second video stream with the second resolution.

In this embodiment, the control apparatus 101 may control, according to the following two implementations, the adaptation apparatus 103 to generate the second video stream.

In a first implementation, the control apparatus 101 may control, according to a requirement of another terminal device for a video stream, the adaptation apparatus 103 to convert a resolution of a video stream. Further, the terminal device 2 may send a selection and viewing request for the terminal device 1 to the control apparatus 101, to request a video stream belonging to the terminal device 1 from the control apparatus 101. The selection and viewing request may carry a resolution identifier. The resolution identifier indicates a value of a resolution of a video stream selected by the terminal device 2 for viewing, for example, may indicate that the resolution of the video stream selected by the terminal device 2 for viewing is the second resolution. Further, the selection and viewing request may carry an identifier of the terminal device 1, which indicates to request to obtain the video stream belonging to the terminal device 1. When the forwarding apparatus 102 receives the first video stream, the control apparatus 101 may determine the resolution of the first video stream, and determine whether the resolution of the first video stream matches the resolution identifier in the selection and viewing request, and further may determine whether a value of the resolution of the first video stream is consistent with the value of the resolution indicated by the resolution identifier. If the value of the resolution of the first video stream is consistent with the value of the resolution indicated by the resolution identifier, the resolution of the first video stream matches the resolution identifier in the selection and viewing request. If the value of the resolution of the first video stream is not consistent with the value of the resolution indicated by the resolution identifier, the resolution of the first video stream does not match the resolution identifier in the selection and viewing request.

When it is determined that the resolution of the first video stream does not match the resolution identifier, the control apparatus 101 may generate a control instruction including the resolution identifier, and send the control instruction to the adaptation apparatus 103, to control the adaptation apparatus 103 to generate the second video stream with the second resolution according to the control instruction. For example, an interface I may be configured on the adaptation apparatus 103, and the control apparatus 101 may invoke the interface I to send the control instruction to the adaptation apparatus 103, to create a video stream scaling task (namely, a task of generating a video stream with another resolution) in the adaptation apparatus 103. An invoking parameter for invoking the interface I may include an identifier, a coding protocol, and the resolution of the first video stream, and an identifier, a coding protocol, and the resolution of the second video stream.

When it is determined that the resolution of the first video stream matches the resolution identifier, it indicates that the resolution of the first video stream provided by the terminal device 1 meets a requirement of the terminal device 2, and the control apparatus 101 may directly control the forwarding apparatus 102 to send the first video stream to the terminal device 2.

In a second implementation, the control apparatus 101 actively controls the adaptation apparatus 103 to generate a plurality of video streams with different resolutions. Further, when the forwarding apparatus 102 receives the first video stream, the control apparatus 101 may determine the resolution of the first video stream, and generate a control instruction based on the resolution of the first video stream. The control instruction includes identifiers of a plurality of resolutions, and none of the identifiers of the plurality of resolutions indicates the first resolution. Then, the control apparatus 101 may send the control instruction to the adaptation apparatus 103. The adaptation apparatus 103 generates a video stream with a corresponding resolution based on the identifier of each resolution carried in the control instruction, to obtain a plurality of video streams with different resolutions (including the video stream with the second resolution). In this case, when the terminal device 2 requests a video stream with any resolution, the multimedia processing system 200 may find a video stream with the corresponding resolution from the plurality of video streams, and provide the video stream to the terminal device 2.

For example, it is assumed that the resolution of the first video stream sent by the terminal device 1 is 720P. In this case, the control apparatus 101 may control the adaptation apparatus 103 to generate video streams with a resolution of 1080P, a resolution of 360P, a resolution of 180P, and a resolution of 90P based on the first video stream, so that the multimedia processing system 200 has the plurality of video streams with the resolutions of 1080P, 720P, 360P, 180P, and 90P. In this case, when the terminal device 2 requests a video stream with a resolution of 1080P, the multimedia processing system 200 may provide the video stream with the resolution of 1080P in the plurality of video streams to the terminal device 2; or when the terminal device 2 requests a video stream with a resolution of 180P, the multimedia processing system 200 may provide the video stream with the resolution of 180P in the plurality of video streams to the terminal device 2.

Figure 4:
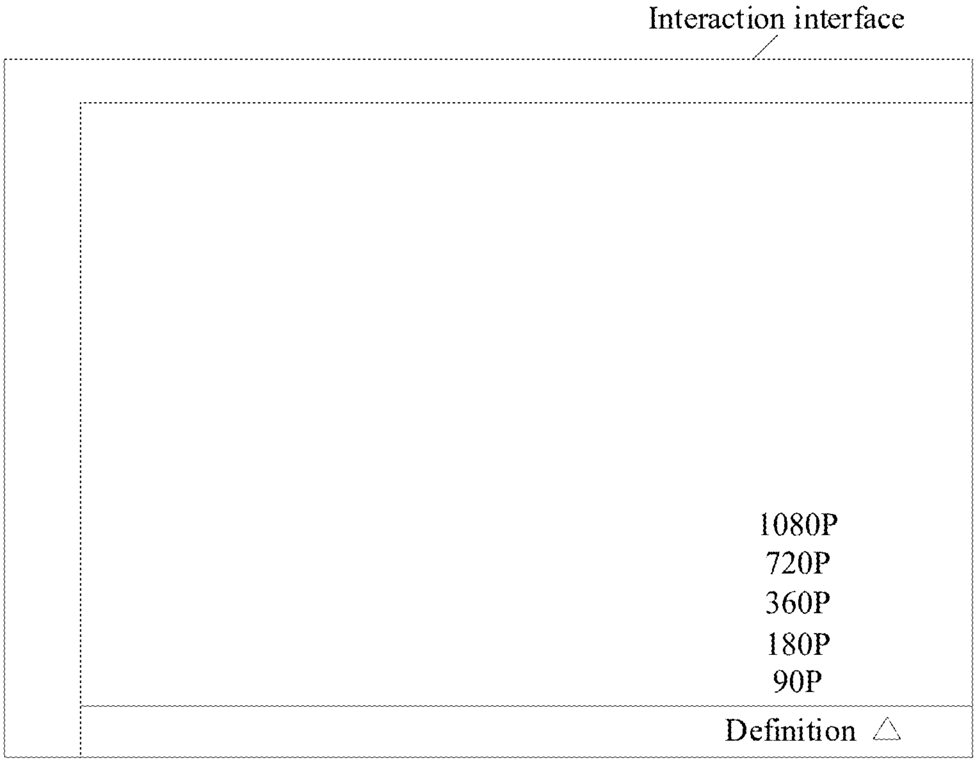
FIG. 4 is a diagram of an example of an interaction interface according to this application.

During actual application, the control apparatus 101 may determine to provide a plurality of supported resolutions, such as the foregoing resolutions of 1080P, 720P, 360P, 180P, and 90P, to the terminal device 2, so that the control apparatus 101 can send the plurality of resolutions to the terminal device 2 for a user 2 to perform selection on the plurality of resolutions. For example, the control apparatus 101 may present an interaction interface shown in FIG. 4 to the user 2 by using the terminal device 2. Candidate items of the plurality of resolutions, such as 1080P, 720P, 360P, 180P, and 90P in FIG. 4, may be presented in the interaction interface. In this case, the user 2 may select one of the resolutions in the interaction interface, for example, select the resolution of 1080P, so that the multimedia processing system 200 provides a video stream with the resolution to the terminal device 2. In this way, selectability of a resolution of a video stream for a user can be improved, and user experience of the user viewing a video can be further improved.

Further, before the terminal device 1 performs video interaction with the terminal device 2, the terminal device 1 may further report, to the control apparatus 101 based on the computing power of the terminal device 1 or the condition of the network transmission, one or more resolutions of a video stream whose generation is supported by the terminal device 1. In this case, when the control apparatus 101 determines that the terminal device 2 selects a resolution that is not supported by the terminal device 1, the control apparatus 101 may determine to generate, based on the first video stream sent by the terminal device 1, the second video stream that meets the resolution required by the terminal device 2. For example, the terminal device 1 may report to the control apparatus 101 that the terminal device 1 supports generation of video streams with resolutions of 360P, 180P, and 90P. When the control apparatus 101 determines that the terminal device 2 requests a video stream with a resolution of 1080P, the control apparatus 101 may indicate the terminal device 1 to upload a first video stream with a resolution of 360P, and control the adaptation apparatus 103 to perform conversion based on the first video stream with the resolution of 360P to obtain a second video stream with a resolution of 1080P, to subsequently send the second video stream to the terminal device 2. Because the computing power or the condition of the network transmission may dynamically change in a running process of the terminal device 1, the terminal device 1 may dynamically adjust, based on computing power of the terminal device 1 or a condition of network transmission, a resolution, reported to the control apparatus 101, of a video stream whose generation is supported by the terminal device 1.

For example, an interface A may be configured on the control apparatus 101, and the terminal device 1 may report coding capability information of the terminal device 1 to the control apparatus 101 through the interface A. The coding capability information further includes a coding protocol, one or more resolutions at which coding is supported, and a network bandwidth corresponding to each resolution. For example, the coding capability information reported by the terminal device 1 through the interface A includes: the H.264 protocol (which is a coding protocol and a codec standard for highly compressing a digital video); 1080P, 3 megabits per second (Mbps) to 4 Mbps; 720P, 1.2 Mbps to 3 Mbps; and 360P, 320 kilobits per second (kbps) to 1200 kbps.

The foregoing two implementations are merely some examples for description. In an actual application scenario, the control apparatus 101 may alternatively control, in another manner, the adaptation apparatus 103 to generate video streams with different resolutions. This is not limited herein.

S305: The adaptation apparatus 103 provides the second video stream to the forwarding apparatus 102.

S306: The control apparatus 101 sends a forwarding instruction for the second video stream to the forwarding apparatus 102.

The control apparatus 101 may generate the forwarding instruction based on a request sent by the terminal device 2 for obtaining a video stream of the terminal device 1.

S307: The forwarding apparatus 102 forwards the second video stream to the terminal device 2 according to the forwarding instruction, where both the terminal device 2 and the terminal device 1 access a same video application.

Before the forwarding apparatus 102 sends the second video stream, a sending node may be created. The sending node may be implemented by using a thread, a process, or the like, so that the forwarding apparatus 102 can send data to the terminal device 2 by using the sending node. Further, the sending node first performs post-encoding processing on the second video stream, to obtain a plurality of data packets. For example, the forwarding apparatus 102 may first segment the second video stream into a plurality of video stream segments, and generate one data packet based on each video stream segment, to obtain a plurality of data packets that carry the second video stream. Then, the sending node may send the plurality of data packets corresponding to the second video stream to the terminal device 2 based on downstream information carried in the forwarding instruction, such as an IP address of the terminal device 2, to meet a requirement of the terminal device 2 for obtaining the video stream with the second resolution.

The multimedia processing system 200 can generate the second video stream with the higher resolution based on the first video stream sent by the terminal device 1, and send the second video stream to the terminal device 2. Therefore, even if the computing power of the terminal device 1 is low or the condition of the network transmission is limited, the terminal device 2 can still obtain the video stream with the higher resolution due to transcoding performed by the multimedia processing system 200 on the video stream, so that definition of a video viewed by the user 2 on the terminal device 2 can be improved. In other words, user experience of the user 1 and the user 2 using the terminal devices for video interaction can be improved.

An interface 2 may be configured on the forwarding apparatus 102, and the control apparatus 101 may pre-invoke the interface 2, to create, in the forwarding apparatus 102, the sending node configured to send the second video stream to the terminal device 2. An interface parameter for the control apparatus 101 to invoke the interface 2 may include an identifier of a destination device, namely, an identifier of the terminal device 2 (which may be allocated by the control apparatus 101 when the terminal device 2 joins the cloud conferencing). In addition, the interface parameter may further include a local IP address, a port number, a used network transmission protocol, and related information of the video stream that are for the forwarding apparatus 102 to send the second video stream.

During actual application, the forwarding apparatus 102 may further establish a routing relationship for the receiving node and the sending node based on flow of a video stream between the receiving node and the sending node. Further, after the receiving node receives the first video stream, the forwarding apparatus 102 may record a source flow identifier of the first video stream. The source flow identifier may be, for example, an IP address or a media access control (MAC) address of the terminal device 1, and indicates a source end of the video stream. After the sending node sends the second video stream, the forwarding apparatus 102 may record a destination flow identifier of the second video stream. The destination flow identifier may be, for example, an IP address or a MAC address of the terminal device 2, and indicates a destination end of the video stream. Then, the forwarding apparatus 102 may establish the routing relationship for the receiving node and the sending node based on the source flow identifier and the destination flow identifier, and store the routing relationship. In this case, the forwarding apparatus 102 may receive a new video stream having the same source flow identifier by using the receiving node, and the forwarding apparatus 102 may select, by searching for the routing relationship and based on a destination flow identifier of a new video stream (whose resolution is changed) generated based on the video stream, a corresponding sending node to send the video stream. In addition, the forwarding apparatus 102 may create a plurality of different receiving nodes to respectively receive video streams sent by different terminal devices; and the forwarding apparatus 102 may create a plurality of different sending nodes to respectively send video streams to different terminal devices. A routing relationship may be established between different receiving nodes and different sending nodes based on a source flow identifier and a destination flow identifier of video streams before and after resolution conversion. The routing relationship may be represented by a data structure such as a map, a linked list, or an array, and the routing relationship is stored in the forwarding apparatus 102.

For example, an interface 3 may be configured on the forwarding apparatus 102, and after the forwarding apparatus 102 completes receiving and sending of video streams by using a receiving node and a sending node, the control apparatus 101 may invoke the interface 3, to establish, in the forwarding apparatus 102, a routing relationship for the receiving node and the sending node. An interface parameter for the control apparatus 101 to invoke the interface 3 may include a source flow identifier and a destination flow identifier. Further, the interface parameter may further include an identifier of a source device and an identifier of a destination device.

Further, the control apparatus 101 may further terminate an established routing relationship in the forwarding apparatus 102. For example, an interface 4 may be configured on the forwarding apparatus 102, and when the terminal device 2 stops requesting a video stream of the terminal device 1, the control apparatus 101 may invoke the interface 4, to terminate the routing relationship between the receiving node receiving the first video stream and the sending node sending the second video stream. An interface parameter for invoking the interface 4 may include a destination flow identifier. Optionally, the interface parameter for invoking the interface 4 may further include a source flow identifier.

In addition, the control apparatus 101 may further delete a receiving node and a sending node in the forwarding apparatus 102. For example, an interface 5 may be configured on the forwarding apparatus 102, and when the terminal device 1 or the terminal device 2 is disconnected from the multimedia processing system 200, for example, the terminal device 1 or the terminal device 2 exits the cloud conferencing, the control apparatus 101 may invoke the interface 5, to delete the receiving node receiving the first video stream of the terminal device 1 or delete the sending node sending the second video stream to the terminal device 2. An interface parameter for invoking the interface 5 may include a source flow identifier and a destination flow identifier, or include an identifier of a source device and an identifier of a destination device. Correspondingly, the routing relationship established based on the receiving node and the sending node may also be deleted.

It should be noted that the interface 1 to the interface 5 may be five independent interfaces. Alternatively, some or all of the interface 1 to the interface 5 may be combined. For example, the interface 3 and the interface 4 may be combined into one interface (the plurality of interfaces mentioned in this application may be combined or independent of each other). This is not limited herein.

Figure 5:
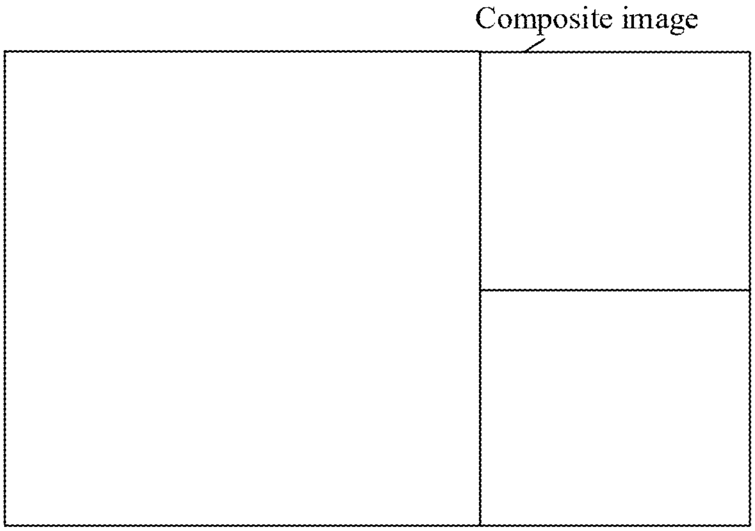
FIG. 5 is a diagram of a composite image generated based on three video streams.

In an application scenario, the terminal device 2 may request a video stream of only one terminal device (namely, the terminal device 1) from the multimedia processing system 200, and present corresponding video content based on the video stream. However, in another application scenario, the terminal device 2 may alternatively simultaneously request video streams of a plurality of terminal devices (including the first video stream of the terminal device 1) from the multimedia processing system 200, for example, simultaneously request video streams of the terminal device 1, the terminal device 3, and the terminal device 4. Resolutions of the requested video streams of the terminal devices may be the same (for example, all are the second resolution), or may be different. In this case, the multimedia processing system 200 may convert, in a manner similar to the foregoing manner, each video stream sent by the plurality of terminal devices into a video stream whose resolution meets a requirement of the terminal device 2. In this case, after receiving the video streams belonging to the plurality of terminal devices, the terminal device 2 may perform video composition on the plurality of video streams using a multi-image composition technology to obtain a composite video stream, and display a composite image on the terminal device 2 based on the composite video stream. For example, the terminal device 2 may generate a composite image shown in FIG. 5 based on the plurality of video streams belonging to the terminal device 1, the terminal device 3, and the terminal device 4. Video streams belonging to different terminal devices have different display areas in a video image, so that content of a plurality of video streams can be simultaneously presented in a same video image.

It should be noted that, in this embodiment, an example in which the multimedia processing system 200 converts the video stream with the first resolution sent by the terminal device 1 into the video stream with the second resolution required by the terminal device 2 is mainly used for description. When the terminal device 3 or the terminal device 4 requests a video stream belonging to the terminal device 1 from the multimedia processing system 200, the multimedia processing system 200 may convert, in a manner similar to the foregoing manner, the video stream with the first resolution into a video stream whose resolution meets a requirement of the terminal device 3 or the terminal device 4. In addition, when the terminal device 1 requests a video stream of the terminal device 2 from the multimedia processing system 200, the multimedia processing system 200 may also transcode, in a manner similar to the foregoing manner, a video stream provided by the terminal device 2 to the terminal device 1 into a video stream whose resolution meets a requirement of the terminal device 1. For a specific implementation in which the multimedia processing system 200 processes a video stream in interaction between different terminal devices, refer to related descriptions in the foregoing embodiment. Details are not described herein again.

In addition, when a plurality of terminal devices simultaneously requests video streams with different resolutions of the terminal device 1 from the multimedia processing system 200, the multimedia processing system 200 may generate video streams with the different resolutions based on the first video stream provided by the terminal device 1, and respectively provide the plurality of generated video streams to the different terminal devices.

Alternatively, when a plurality of terminal devices simultaneously request video streams with different resolutions of the terminal device 1 from the multimedia processing system 200, if resolutions of video streams requested by some of the terminal devices are low, for example, a terminal device a in the plurality of terminal devices requests a video stream with a resolution of 180P and a terminal device b requests a video stream with a resolution of 360P, and a terminal device c in the plurality of terminal devices requests a video stream with a resolution of 1080P, the terminal device 1 may generate a plurality of video streams with low resolutions based on the computing power of the terminal device 1 or the condition of the network transmission, for example, generate a video stream with a resolution of 180P and a video stream with a resolution of 360P, and provide the plurality of video streams with the low resolutions to the multimedia processing system 200. In this case, because the video streams requested by the terminal device a and the terminal device b already exist in the multimedia processing system 200, the multimedia processing system 200 may forward the video stream with the resolution of 180P to the terminal device a, and forward the video stream with the resolution of 360P to the terminal device b. Because the terminal device 1 does not provide a video stream with a resolution of 1080P, the multimedia processing system 200 may generate a video stream with a resolution of 1080P for the terminal device c based on the video stream with the resolution of 180P or the video stream with the resolution of 360P in a manner similar to the foregoing implementation, and send the video stream with the resolution of 1080P to the terminal device c.

Further, if a terminal device d requests a video stream with a resolution of 90P of the terminal device 1 from the multimedia processing system 200, the multimedia processing system 200 may preferentially select the video stream with the resolution of 180P for generating a video stream with a resolution of 90P, to reduce, as much as possible, resources required for generating the video stream with the resolution of 90P by the multimedia processing system 200.

Figure 6:
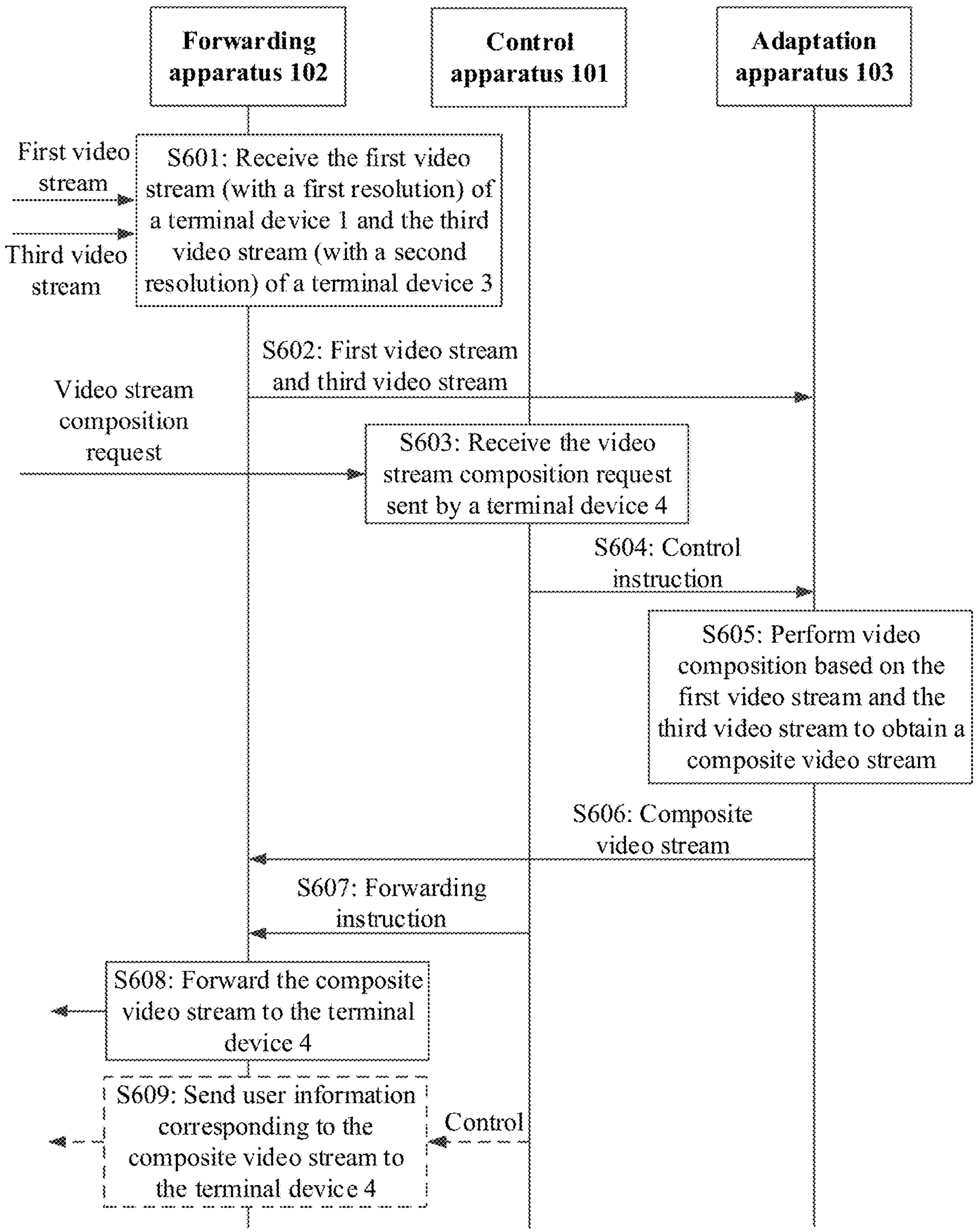
FIG. 6 is a schematic flowchart of another multimedia processing method according to this application.

In the embodiment shown in FIG. 3, a process in which the terminal device 2 requests a video stream of one terminal device (namely, the terminal device 1) from the multimedia processing system 200 is mainly described. In an actual application scenario, some terminal devices may request video streams of a plurality of other terminal devices from the multimedia processing system 200. However, computing power of the terminal devices that receive the video streams is also limited, or a condition of network transmission during receiving of the video streams by the terminal devices is limited. Therefore, in another possible manner, a process of performing composition on the plurality of video streams by the terminal devices may be migrated to the multimedia processing system 200, to avoid adverse impact on multi-image presentation on the terminal devices caused by the limited computing power of the terminal devices or the limited condition of network transmission. The following describes another multimedia processing method provided in an embodiment of this application with reference to FIG. 6 by using an example in which the multimedia processing system 200 performs composition on video streams of the terminal device 1 and the terminal device 3 for the terminal device 4. As shown in FIG. 6, the method may specifically include the following steps.

S601: The forwarding apparatus 102 receives a first video stream from the terminal device 1 and a third video stream from the terminal device 3, where a resolution of the first video stream is a first resolution, and a resolution of the third video stream is a second resolution.

In an application scenario, before a plurality of terminal devices perform video interaction, the terminal device 4 (or another terminal device) may create a virtual room in advance. The virtual room is a virtual network space created based on simulation of a real room. The virtual network space may allow a plurality of accounts to be simultaneously online, and each account may be created in the virtual network space and corresponds to one terminal device. Then, the terminal device 1, the terminal device 3, and the terminal device 4 all join the created virtual room. In addition, after joining the virtual room, the terminal device 1 and the terminal device 3 separately send video streams generated by the terminal device 1 and the terminal device 3 to the multimedia processing system 200.

In another application scenario, the terminal device 4 may send a selection and viewing request to the control apparatus 101. The selection and viewing request include video streams of a plurality of terminal devices, to request the control apparatus 101 to obtain the video streams of the plurality of terminal devices specified by the selection and viewing request. The control apparatus 101 responds to the selection and viewing request, and indicates the terminal device 1 and the terminal device 3 to provide video streams.

For example, an interface B may be configured on the control apparatus 101, and the terminal device 4 may specify the video streams of the plurality of terminal devices to the control apparatus 101 through the interface B. An interface parameter of the interface B may include identifiers respectively corresponding to a plurality of terminal devices that provide video streams and identifiers respectively corresponding to a plurality of video streams. Further, the interface parameter may include a coding protocol, a resolution of each video stream, and the like. For example, information provided by the terminal device 4 to the control apparatus 101 through the interface B may include: an identifier of the terminal device 1, a source flow identifier 1, the H.264 protocol, and a resolution of 720P; and an identifier of the terminal device 3, a source flow identifier 2, the H.264 protocol, and a resolution of 1080P.

In this embodiment, it is assumed that the resolution of the video stream sent by the terminal device 1 is the first resolution (for example, 720P), and the resolution of the video stream sent by the terminal device 3 is the second resolution (for example, 1080P). The second resolution may be greater than the first resolution. In another embodiment, the resolutions of the video streams sent by the terminal device 1 and the terminal device 3 may alternatively be the same, or the resolution of the video stream sent by the terminal device 1 is greater than the resolution of the video stream sent by the terminal device 3. This is not limited herein. A resolution of a video stream sent by each terminal device may be determined by a user 4 to which the terminal device 4 belongs.

In an implementation example, after joining the virtual room, the terminal device 1 and the terminal device 3 may report, to the control apparatus 101, resolutions at which the terminal device 1 and the terminal device 3 support coding. For example, the terminal device 1 reports that resolutions at which the terminal device 1 supports coding include 1080P, 720P, 360P, 180P, and 90P, and the terminal device 3 reports that resolutions at which the terminal device 3 supports coding include 360P, 180P, and 90P. Then, the control apparatus 101 may provide, to the terminal device 4, the resolutions at which the terminal device 1 and the terminal device 3 support coding, so that the terminal device 4 presents the resolutions to the user. Next, the terminal device 4 may feed back, to the control apparatus 101 based on a selection operation performed by the user on a resolution, of a video stream, provided by each terminal device, that the terminal device 1 provides the video stream with the first resolution and the terminal device 3 feeds back the video stream with the second resolution. In this case, the control apparatus 101 may indicate the terminal device 1 and the terminal device 3 to respectively send the first video stream and the third video stream.

S602: The forwarding apparatus 102 provides the first video stream and the third video stream to the adaptation apparatus 103.

S603: The control apparatus 101 receives a video stream composition request sent by the terminal device 4, where the video stream composition request is used to request the multimedia processing system 200 to perform a process of composing a video stream for the terminal device 4.

For example, after receiving the video stream composition request sent by the terminal device 4, the control apparatus 101 may determine to perform video composition on video streams of a plurality of other terminal devices that join the virtual room.

Alternatively, the video stream composition request may carry identifiers of a plurality of terminal devices, so that the control apparatus 101 can determine to perform video composition on video streams of the plurality of terminal devices indicated by the identifiers.

In an actual application scenario, due to a hardware condition limitation, computing power or network transmission performance of some terminal devices is low, or computing power or network transmission performance of some terminal devices having high computing power and network transmission performance may fluctuate in a running process. Consequently, it is difficult to complete a video composition process of a plurality of video streams in time. Therefore, when detecting that computing power is insufficient or network transmission performance is low, the terminal device 4 may send the video stream composition request to the control apparatus 101, to request the multimedia processing system 200 to perform a composition process of a plurality of video streams for the terminal device 4. In addition, when the computing power of the terminal device 4 is sufficient and the network transmission performance is high, the terminal device 4 may also request the multimedia processing system 200 to perform a composition process of a plurality of video streams for the terminal device 4. Alternatively, the terminal device 4 may determine, based on a quantity of video streams on which composition is to be performed, whether to send the video stream composition request to the multimedia processing system 200. For example, when the quantity of video streams on which composition is to be performed is greater than a threshold, the terminal device 4 may send the video stream composition request to the multimedia processing system 200; or when the quantity of video streams on which composition is to be performed is not greater than the threshold, the terminal device 4 may perform composition on a plurality of video streams forwarded by the multimedia processing system 200. The threshold may be determined based on a hardware condition of the terminal device 4, or the threshold may be determined based on real-time computing power or network transmission performance of the terminal device 4. In this way, the terminal device 4 can be supported in dynamically switching, based on an actual resource condition, between the two modes of video composition performed by the multimedia processing system 200 and video composition performed by the terminal device 4. This helps make full use of resources on the terminal device 4 when a composite video stream is obtained.

S604: The control apparatus 101 sends a control instruction to the adaptation apparatus 103, where the control instruction instructs the adaptation apparatus 103 to perform a video composition operation.

S605: The adaptation apparatus 103 performs video composition based on the first video stream and the third video stream according to the control instruction to obtain a composite video stream.

For example, this embodiment provides the following two implementations of controlling the adaptation apparatus 103 to perform video composition.

Figure 7A:
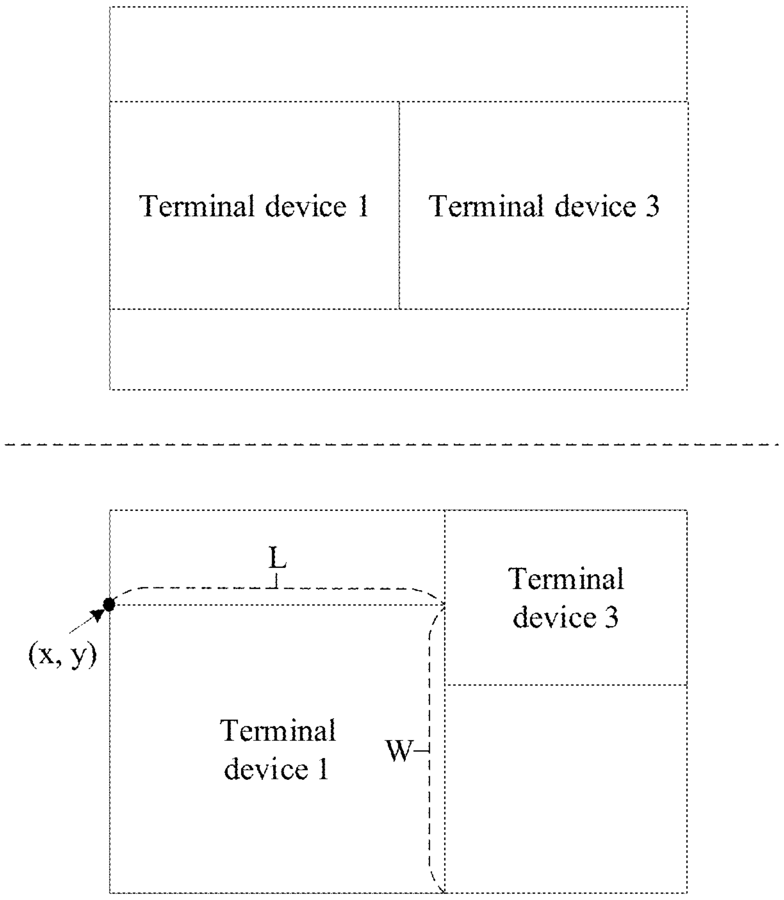
FIG. 7A is a diagram of an example of an image display mode for two video streams according to this application.
Figure 7B:
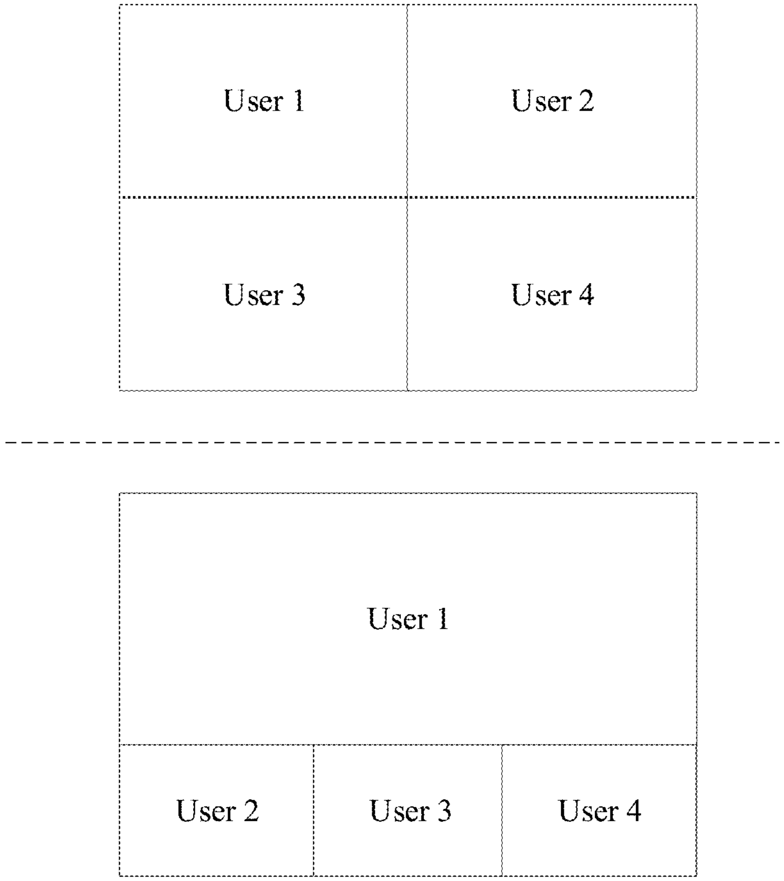
FIG. 7B is a diagram of an example of an image display mode for four video streams according to this application.

In a first implementation, the video stream composition request received by the control apparatus 101 may include an identifier of a target image display mode and a quantity of a plurality of video streams participating in composition. The image display mode indicates display areas of the plurality of video streams participating in video composition in a video image. For example, when video composition is performed based on the two video streams provided by the terminal device 1 and the terminal device 3, the image display mode may indicate that display areas of the two video streams in the video image are shown in an upper part of FIG. 7A or shown in a lower part of FIG. 7A. For another example, when video composition is performed based on four video streams, the image display mode may indicate that display areas of the four video streams in the video image are shown in an upper part of FIG. 7B or shown in a lower part of FIG. 7B. For ease of distinguishing from the following descriptions, in this embodiment, the image display mode identified in the video stream composition request is described as the target image display mode.

During actual application, a number carried in the video stream composition request may indicate the identifier of the target image display mode and the quantity of the plurality of video streams participating in the composition. For example, the video stream composition request may include "2-1", where "2" indicates that two video streams are used for video composition, that is, indicates that two small images exist in a composite video image, and "1" is the identifier of the target image display mode. The target image display mode identified by "1" may indicate, for example, a display area layout shown in FIG. 7A. For another example, the video stream composition request may include "4-5", where "4" indicates that four video streams are used for video composition, and "5" is the identifier of the target image display mode. The target image display mode identified by "5" may indicate, for example, a display area layout shown in the upper part of FIG. 7B (or a display area layout shown in the lower part of FIG. 7B, where a specific indicated display area layout may be determined based on a preconfigured mapping relationship between different numbers and corresponding image display modes).

Then, the control apparatus 101 may determine the target image display mode based on the identifier in the video stream composition request, and generate a control instruction 1 based on the target image display mode, where the control instruction 1 includes the target image display mode, the quantity of the plurality of video streams participating in the composition, and indication information of a composition operation; and send the control instruction 1 to the adaptation apparatus 103. In this case, under the control of the control instruction 1, the adaptation apparatus 103 determines a specific position of the display area of each video stream in the video image based on the target image display mode, and performs video composition on the first video stream and the third video stream based on the specific position to obtain the composite video stream. For example, the adaptation apparatus 103 may generate the composite video stream using a composition technology such as pixel-domain composition or compression-domain composition. A resolution of the generated composite video stream may be the first resolution, or may be the second resolution, or may be a resolution of another value. This is not limited herein.

For example, after receiving the first video stream and the third video stream, the adaptation apparatus 103 may first perform pre-decoding processing on the two video streams, for example, perform an integrity check on the video streams, and decode two video streams obtained through the pre-decoding processing, to obtain data streams in a YUV format that correspond to the two video streams respectively. Then, because the two data streams in the YUV format correspond to different resolutions, the adaptation apparatus 103 may scale one or both of the data streams. After the scaling, the two data streams in the YUV format correspond to a same resolution, for example, both correspond to the second resolution. Next, the adaptation apparatus 103 performs video composition on the two data streams in the YUV format based on the display areas, corresponding to the different video streams, indicated by the target image display mode, to obtain a new data stream. Finally, the adaptation apparatus 103 may encode the new data stream to obtain the composite video stream. The resolution of the composite video stream may be the second resolution (for example, 1080P). In another implementation example, after obtaining the new data stream, the adaptation apparatus 103 may scale the data stream to obtain a data stream with another resolution (for example, a resolution of 4K). In this case, the resolution of the composite video stream obtained by encoding the scaled data stream may be a resolution of another value, for example, the resolution of 4K.

A plurality of image display modes may be preconfigured in the control apparatus 101, for example, may be preconfigured in the control apparatus 101 by a skilled person. In this case, after receiving the video stream composition request, the control apparatus 101 may read a configuration file to determine the plurality of image display modes, and determine the target image display mode from the plurality of image display modes based on the identifier of the target image display mode in the video stream composition request. Alternatively, custom information of the user for the target image display mode may be preconfigured in the control apparatus 101. Further, the control apparatus 101 may present a customization interface to the user in advance by using the terminal device 4, so that the user can define, in the customization interface (according to a requirement or preference), an arrangement of a plurality of small images in the entire video image, namely, the display area of each video stream in the plurality of video streams in the video image. In this way, the user can customize the target image display mode, and information indicating the target image display mode is generated. In this case, after receiving the video stream composition request, the control apparatus 101 may determine, based on the identifier in the video stream composition request, the user-defined target image display mode.

For example, an interface C may be configured on the control apparatus 101, and the terminal device 4 may send the video stream composition request to the control apparatus 101 through the interface C. An interface parameter of the interface C may include the quantity of the video streams, the target image display mode, an identifier of the composite video stream, a coding protocol and a resolution of the composite video stream, a network bandwidth for the composite video stream, and the like. Further, the interface parameter may further include an identifier of each video stream participating in composition, an identifier of a terminal device to which each video stream belongs, a coding protocol and a resolution of each video stream, position coordinates of the display area of each video stream in the video image, and the like.

In a second implementation, the video stream composition request received by the control apparatus 101 may include coordinates of a key point, a length, and a width that correspond to a display area of each video stream participating in composition in a video image. The key point corresponding to the display area may be, for example, a pre-specified position point such as an upper left corner or a central point of the display area. The coordinates of the key point may be, for example, coordinates of a pixel corresponding to the key point. For example, the video stream composition request may include indication information of the coordinates of the key point, the length, and the width that correspond to the display area of the video stream in the video image. As shown in the lower part of FIG. 7A, (x, y) indicates the coordinates of the key point corresponding to the display area, L indicates the length corresponding to the display area, and W indicates the width corresponding to the display area.

Then, the control apparatus 101 may generate a control instruction 2 based on the video stream composition request, where the control instruction 2 may include indication information of a composition operation, and the coordinates of the key point, the length, and the width that correspond to the display area of each video stream participating in the composition in the video image; and send the control instruction 2 to the adaptation apparatus 103. In this case, under the control of the control instruction 2, the adaptation apparatus 103 may determine a specific position of the display area of each video stream in the video image, and perform video composition on the first video stream and the third video stream based on the specific position to obtain the composite video stream.

During actual application, an interface II may be configured on the adaptation apparatus 103, and the control apparatus 101 may invoke the interface II to send a control instruction (for example, the control instruction 1 or the control instruction 2) to the adaptation apparatus 103, to create a video stream composition task (namely, a task of performing composition on the plurality of video streams) in the adaptation apparatus 103. An invoking parameter for invoking the interface II may include an identifier, a coding protocol, and a resolution of each video stream in the plurality of video streams, the target image display mode (or the coordinates of the key point, the length, and the width of the display area corresponding to each video stream), an identifier of the composite video stream, and a coding protocol and a resolution of the composite video stream.

S606: The adaptation apparatus 103 provides the composite video stream to the forwarding apparatus 102.

S607: The control apparatus 101 sends a forwarding instruction for the composite video stream to the forwarding apparatus 102.

S608: The forwarding apparatus 102 forwards the composite video stream to the terminal device 4 according to the forwarding instruction.

Before sending the composite video stream, the forwarding apparatus 102 may first perform post-encoding processing on the composite video stream, to obtain a plurality of data packets. For example, the forwarding apparatus 102 may first segment the composite video stream into a plurality of video stream segments, and generate one data packet based on each video stream segment, to obtain a plurality of data packets that carry the composite video stream. Then, the forwarding apparatus 102 may send the plurality of data packets corresponding to the composite video stream to the terminal device 4 based on information such as an IP address of the terminal device 4 carried in the forwarding instruction.

The multimedia processing system 200 can perform video composition based on video streams sent by a plurality of terminal devices, and send an obtained composite video stream to the terminal device 4. Therefore, even if the computing power of the terminal device 4 is low or a condition of network transmission is limited, the terminal device 4 can still obtain the composite video stream. In this way, the user can view, on the terminal device 4, a plurality of images corresponding to the plurality of video streams, so that user experience of different users using terminal devices for video interaction is improved.

Further, the embodiment shown in FIG. 6 may further include the following step.

S609: The forwarding apparatus 102 sends user information corresponding to the composite video stream to the terminal device 4, where the user information indicates a user to which each video stream participating in the composition belongs.

For example, when the display area of each video stream participating in the composition in the video image is already determined, the forwarding apparatus 102 may send the user information to the terminal device 4 in a form of user identifier list. Correspondingly, the terminal device 4 may add, in a specific sequence, user identifiers (for example, user names) in the user identifier list to a corresponding display area for display.

In a possible implementation, the video stream composition request sent by the terminal device 4 to the control apparatus 101 may further include user information, and the user information includes a plurality of user identifiers. In this case, the control apparatus 101 may determine, based on the user information, whether the multimedia processing system 200 has all video streams belonging to a plurality of users indicated by the user information. If the multimedia processing system 200 does not have video streams belonging to some of the users, the control apparatus 101 may indicate terminal devices of some users to provide the video streams. After determining that all the video streams belonging to the plurality of users indicated by the user information are already obtained, the control apparatus 101 may control the adaptation apparatus 103 to perform composition on the plurality of video streams. The obtained composite video stream and a user identifier corresponding to each display area in the video image together are sent to the terminal device 4. The user identifier corresponding to each display area indicates that video content presented in the display area belongs to a user indicated by the user identifier.

In this way, when presenting the video image corresponding to the composite video stream, the terminal device 4 may present, in a display area corresponding to each video stream, video content and a user to which the video content belongs, so that the user learns of an owner of each piece of video content, to improve experience of the user in video interaction.

It should be noted that:

1. In this embodiment, an example in which composition is directly performed on the video streams sent by the terminal device 1 and the terminal device 3 is used for description. In another possible embodiment, the adaptation apparatus 103 may first convert resolutions of the video streams sent by the terminal device 1 and the terminal device 3, for example, may convert both the video stream with the resolution of 720P sent by the terminal device 1 and the video stream with the resolution of 360P sent by the terminal device 3 into a video stream with a resolution of 1080P under the control of the control apparatus 101. For a specific implementation process of converting the resolution of the video stream, refer to related descriptions in the embodiment shown in FIG. 3. Then, the adaptation apparatus 103 performs video composition on two video streams obtained through the resolution conversion to obtain a composite video stream.
2. In a process in which a plurality of users uses terminal devices for video interaction, the terminal device 1 and the terminal device 4 may provide video streams to the terminal device 3. In addition, after performing video composition on the two video streams, the multimedia processing system 200 may provide an obtained composite video stream to the terminal device 3. Similarly, the terminal device 3 and the terminal device 4 may provide video streams to the terminal device 1, so that the terminal device 1 obtains a corresponding composite video stream.
3. A sequence of performing the steps shown in FIG. 6 is not limited. For example, in another embodiment, step S603 may be first performed, and then step S601 and other steps are performed.

In the embodiments shown in FIG. 1 to FIG. 7B, the control apparatus 101, the forwarding apparatus 102, and the adaptation apparatus 103 in the multimedia processing system 200 may be software configured on a computing device or in a computing device cluster, and the computing device or the computing device cluster can implement functions of the multimedia processing system 200 by running the software on the computing device or in the computing device cluster. The following describes the multimedia processing system 200 in detail from the perspective of hardware device implementation.

Figure 8:
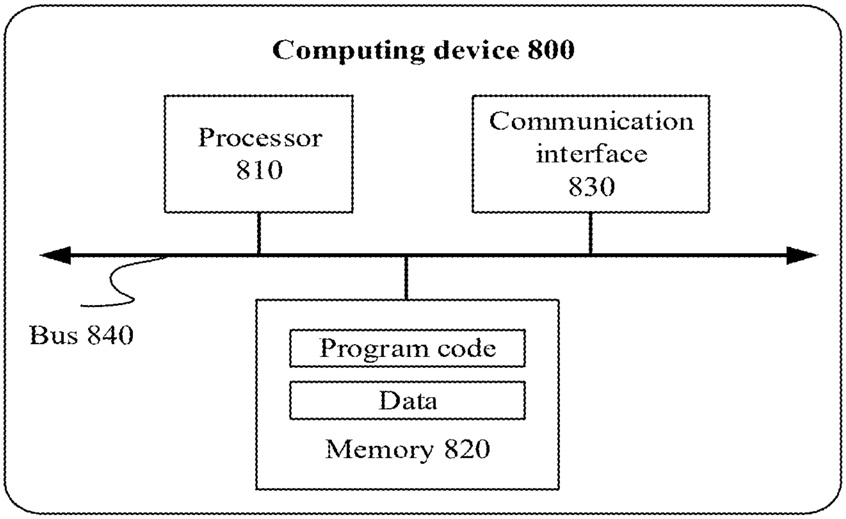
FIG. 8 is a diagram of a structure of a computing device according to this application.

FIG. 8 is a diagram of a structure of a computing device. The multimedia processing system 200 may be deployed on the computing device. The computing device may be a computing device (for example, a server) in a cloud environment, a computing device in an edge environment, a terminal device, or the like, and may be specifically configured to implement functions of the control apparatus 101, the forwarding apparatus 102, and the adaptation apparatus 103 in the embodiment shown in FIG. 1.

As shown in FIG. 8, the computing device 800 includes a processor 810, a memory 820, a communication interface 830, and a bus 840. The processor 810, the memory 820, and the communication interface 830 communicate with each other through the bus 840. The bus 840 may be a Peripheral Component Interconnect (PCI) bus, an Extended Industry Standard Architecture (EISA) bus, or the like. Buses may be classified into an address bus, a data bus, a control bus, and the like. For ease of representation, only one thick line is used to represent the bus in FIG. 8, but this does not mean that there is only one bus or only one type of bus. The communication interface 830 is configured to communicate with the outside, for example, obtain a first video stream, and send a second video stream.

The processor 810 may be a central processing unit (CPU), an application-specific integrated circuit (ASIC), a graphics processing unit (GPU), or one or more integrated circuits. The processor 810 may alternatively be an integrated circuit chip and has a signal processing capability. In an implementation process, functions of the apparatuses in the multimedia processing system 200 may be implemented by using a hardware integrated logic circuit in the processor 810 or by using instructions in a form of software. The processor 810 may alternatively be a general-purpose processor, a data signal processor (DSP), a field-programmable gate array (FPGA) or another programmable logic device, a discrete gate or a transistor logic device, or a discrete hardware component, and may implement or perform the methods, steps, and logical block diagrams disclosed in embodiments of this application. The general-purpose processor may be a microprocessor, or the processor may be any processor, or the like. The methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 820. The processor 810 reads information in the memory 820, and completes some or all of the functions of the multimedia processing system 200 in combination with hardware of the processor.

The memory 820 may include a volatile memory, for example, a random-access memory (RAM). The memory 820 may further include a non-volatile memory, for example, a read-only memory (ROM), a flash memory, a hard disk drive (HDD), or a solid-state drive (SSD).

The memory 820 stores executable code, and the processor 810 executes the executable code to perform the method performed by the multimedia processing system 200 (namely, the apparatuses in the multimedia processing system 200).

Specifically, when the embodiment shown in FIG. 2 is implemented and the control apparatus 101, the forwarding apparatus 102, and the adaptation apparatus 103 described in the embodiment shown in FIG. 2 are implemented by software, software or program code required for performing the functions of the control apparatus 101, the forwarding apparatus 102, and the adaptation apparatus 103 in FIG. 2 is stored in the memory 820, interaction between the forwarding apparatus 102 and another device is implemented through the communication interface 830, and the processor is configured to execute instructions in the memory 820, to implement the method performed by the multimedia processing system 200.

Figure 9:
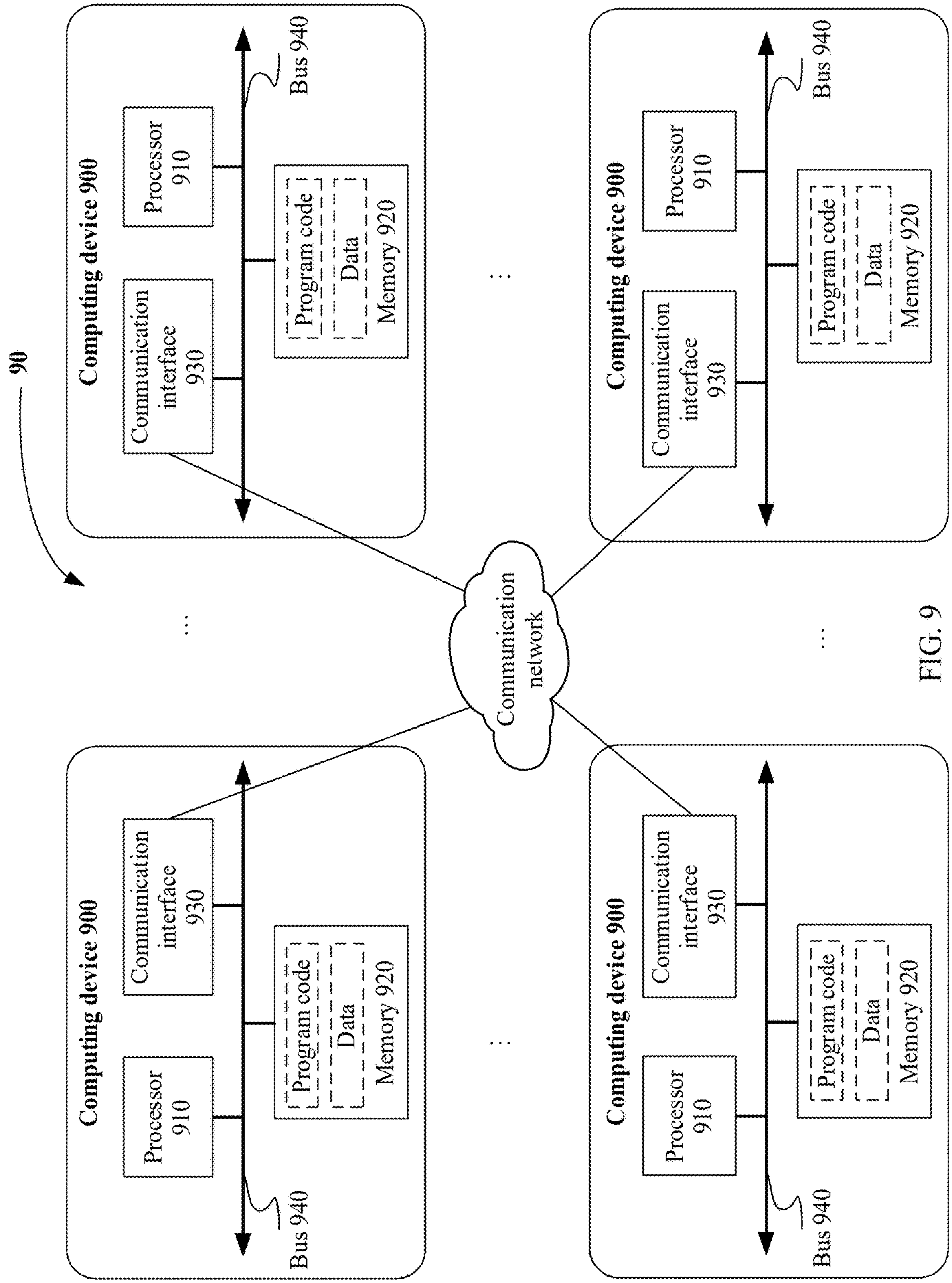
FIG. 9 is a diagram of a structure of a computing device cluster according to this application.

FIG. 9 is a diagram of a structure of a computing device cluster. A computing device cluster 90 shown in FIG. 9 includes a plurality of computing devices, and the multimedia processing system 200 may be deployed on the plurality of computing devices in the computing device cluster 90 in a distributed manner. As shown in FIG. 9, the computing device cluster 90 includes a plurality of computing devices 900, and each computing device 900 includes a memory 920, a processor 910, a communication interface 930, and a bus 940. The memory 920, the processor 910, and the communication interface 930 implement communication connections to each other through the bus 940.

The processor 910 may be a CPU, a GPU, an ASIC, or one or more integrated circuits. The processor 910 may alternatively be an integrated circuit chip and has a signal processing capability. In an implementation process, some of the functions of the multimedia processing system 200 may be implemented by using a hardware integrated logic circuit in the processor 910 or by using instructions in a form of software. The processor 910 may alternatively be a DSP, an FPGA, a general-purpose processor, another programmable logic device, a discrete gate or a transistor logic device, or a discrete hardware component, and may implement or perform some of the methods, steps, and logical block diagrams disclosed in embodiments of this application. The general-purpose processor may be a microprocessor, or the processor may be any processor, or the like. Steps of the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a ROM, a programmable ROM, an electrically erasable programmable memory, or a register. The storage medium is located in the memory 920. In each computing device 900, the processor 910 reads information in the memory 920, and may complete some of the functions of the multimedia processing system 200 in combination with hardware of the processor.

The memory 920 may include a ROM, a RAM, a static storage device, a dynamic storage device, a hard disk (for example, an SSD or an HDD), and the like. The memory 920 may store program code, for example, a part or all of program code used to implement the control apparatus 101, a part or all of program code used to implement the forwarding apparatus 102, and a part or all of program code used to implement the adaptation apparatus 103. For each computing device 900, when the program code stored in the memory 920 is executed by the processor 910, the processor 910 performs, based on the communication interface 930, some of the methods performed by the multimedia processing system 200. For example, some of the computing devices 900 may be configured to perform the method performed by the control apparatus 101, some of the computing devices 900 may be configured to perform the method performed by the forwarding apparatus 102, and some of the computing devices 900 are configured to perform the method performed by the adaptation apparatus 103. The memory 920 may further store data, for example, intermediate data or result data generated by the processor 910 in an execution process, such as the foregoing second video stream or image display mode.

The communication interface 930 in each computing device 900 is configured to communicate with the outside, for example, interact with another computing device 900.

The bus 940 may be a peripheral component interconnect bus, an extended industry standard architecture bus, or the like. For ease of representation, only one thick line is used to represent the bus 940 in each computing device 900 in FIG. 9, but this does not mean that there is only one bus or only one type of bus.

A communication path is established between the plurality of computing devices 900 through a communication network, to implement the functions of the multimedia processing system 200. Any one of the computing devices may be a computing device (for example, a server) in a cloud environment or a computing device in an edge environment.

In addition, an embodiment of this application further provides a computer-readable storage medium. The computer-readable storage medium stores instructions. When the instructions are run on one or more computing devices, the one or more computing devices are enabled to perform the methods performed by the apparatuses in the multimedia processing system 200 in the foregoing embodiments.

In addition, an embodiment of this application further provides a computer program product. When the computer program product is executed by one or more computing devices, the one or more computing devices perform any one of the foregoing multimedia processing methods. The computer program product may be a software installation package. If any one of the foregoing multimedia processing methods needs to be used, the computer program product may be downloaded, and the computer program product may be executed on a computer.

In addition, it should be noted that the described system embodiments are merely examples. The apparatuses described as separate parts may or may not be physically separate, and parts displayed as apparatuses may or may not be physical apparatuses, may be located in one position, or may be distributed on a plurality of network apparatuses. Some or all of modules may be selected according to an actual requirement to achieve the objectives of the solutions of embodiments. In addition, in the accompanying drawings of the system embodiments provided in this application, connection relationships between apparatuses indicate that the apparatuses have communication connections to each other, which may be specifically implemented as one or more communication buses or signal lines.

Based on the descriptions of the foregoing implementations, a person skilled in the art may clearly understand that this application may be implemented by software in addition to necessary universal hardware, or by dedicated hardware, including an application-specific integrated circuit, a dedicated CPU, a dedicated memory, a dedicated component, or the like. Generally, any function that can be performed by a computer program can be easily implemented by using corresponding hardware. In addition, a specific hardware structure configured to achieve a same function may be in various forms, for example, in a form of analog circuit, digital circuit, or dedicated circuit. However, in this application, a software program implementation is a better implementation in most cases. Based on such an understanding, the technical solutions of this application essentially or the part contributing to the technology may be implemented in a form of software product. The computer software product is stored in a readable storage medium, for example, a floppy disk, a Universal Serial Bus (USB) flash drive, a removable hard disk, a ROM, a RAM, a magnetic disk, or an optical disc of a computer, and includes several instructions for instructing a computer device (which may be a personal computer, a training device, a network device, or the like) to perform the methods in embodiments of this application.

All or some of the foregoing embodiments may be implemented by using software, hardware, firmware, or any combination thereof. When software is used to implement embodiments, all or some of the embodiments may be implemented in a form of computer program product.

The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, a computer, a training device, or a data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a training device or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a SSD), or the like.

The invention claimed is:

1. A multimedia processing system configured to communicate with terminal devices and comprising:

a forwarding apparatus configured to receive, from a first terminal device of the terminal devices, a first video stream having a first resolution;

an adaptation apparatus configured to generate, based on the first video stream, a second video stream having a second resolution, wherein the second resolution is greater than the first resolution, wherein the forwarding apparatus is further configured to:

receive, from a second terminal device of the terminal devices, a request to access the second video stream, wherein both the first terminal device and the second terminal device access a same video application; and send, in response to the request, the second video stream to the second terminal device, wherein the terminal devices further comprise a third terminal device and a fourth terminal device, wherein the forwarding apparatus is further configured to receive a third video stream from the third terminal device, wherein the adaptation apparatus is further configured to perform video composition based on the first video stream and the third video stream to obtain a composite video stream, and wherein the forwarding apparatus is further configured to send the composite video stream to the fourth terminal device; and a control apparatus configured to receive, from the fourth terminal device, a second video stream composition request, wherein the second video stream composition request comprises indication information of a composition operation and comprises coordinates of a key point, a length, and a width that correspond to a display area of each video stream participating in composition in a video image, and wherein the adaptation apparatus is further configured to:

receive a second control instruction of the control apparatus, wherein the second control instruction comprises the coordinates; and perform the video composition on the first video stream and the third video stream according to the second control instruction to obtain the composite video stream.

2. The multimedia processing system of claim 1, further comprising a control apparatus configured to receive, from the fourth terminal device, a first video stream composition request comprising an identifier of a target image display mode and a quantity of fourth video streams participating in composition, wherein the target image display mode indicates display areas of the fourth video streams in a video image, and wherein the adaptation apparatus is further configured to: receive a first control instruction of the control apparatus, wherein the first control instruction comprises the quantity, the target image display mode, and indication information of a composition operation; and perform the video composition on the first video stream and the third video stream according to the first control instruction to obtain the composite video stream.

3. The multimedia processing system of claim 2, wherein before receiving the first video stream composition request, the control apparatus is further configured to:

obtain image display modes comprising the target image display mode; or obtain custom information for the target image display mode, wherein the custom information indicates user-defined display areas of the video streams.

4. The multimedia processing system of claim 1, wherein the adaptation apparatus is further configured to generate third video streams based on the first video stream, wherein the third video streams comprise the second video stream, and wherein the third video streams have different resolutions.

5. The multimedia processing system of claim 1, further comprising a control apparatus configured to receive, from the second terminal device, a selection and viewing request for the first terminal device, wherein the selection and viewing request comprises a resolution identifier indicating that a requested resolution of the second video stream is the second resolution, and wherein the adaptation apparatus is further configured to:

obtain the resolution identifier; and generate the second video stream based on the first video stream when the first resolution does not match the resolution identifier.

6. The multimedia processing system of claim 1, wherein the video application is a video conferencing application or a video livestreaming application.

7. The multimedia processing system of claim 1, further comprising a control apparatus configured to:

determine a plurality of resolutions supported by the multimedia processing system, wherein the plurality of resolutions comprises the first resolution and the second resolution; and send the plurality of resolutions to the second terminal device.

8. A method implemented by a multimedia processing system, wherein the method comprises:

receiving, from a first terminal device, a first video stream having a first resolution;

generating, based on the first video stream, a second video stream having a second resolution, wherein the second resolution is greater than the first resolution;

receiving, from a second terminal device, a request to access the second video stream, wherein both the first terminal device and the second terminal device access a same video application;

sending, in response to the request, the second video stream to the second terminal device;

receiving, from a third terminal device, a third video stream;

performing video composition based on the first video stream and the third video stream to obtain a composite video stream;

sending, to a fourth terminal device, the composite video stream;

receiving, from the fourth terminal device, a second video stream composition request, wherein the second video stream composition request comprises indication information of a composition operation and comprises coordinates of a key point, a length, and a width that correspond to a display area of each video stream participating in composition in a video image;

obtaining a second control instruction comprising the coordinates; and performing the video composition on the first video stream and the third video stream according to the second control instruction to obtain the composite video stream.

9. The method of claim 8, further comprising: receiving, from the fourth terminal device, a first video stream composition request, wherein the first video stream composition request comprises an identifier of a target image display mode and a quantity of fourth video streams participating in composition, and wherein the target image display mode indicates display areas of the fourth video streams in a video image; obtaining a first control instruction, wherein the first control instruction comprises the quantity, the target image display mode, and indication information of a composition operation; and performing the video composition on the first video stream and the third video stream according to the first control instruction to obtain the composite video stream.

10. The method of claim 9, wherein before receiving the first video stream composition request, the method further comprises:

obtaining a plurality of image display modes comprising the target image display mode; or obtaining custom information for the target image display mode, wherein the custom information indicates user-defined display areas of the video streams.

11. The method of claim 8, wherein generating the second video stream comprises generating, based on the first video stream, third video streams, wherein the third video streams comprise the second video stream, and wherein the third video streams have different resolutions.

12. The method of claim 8, further comprising:

receiving, from the second terminal device, a selection and viewing request for the first terminal device, wherein the selection and viewing request comprises a resolution identifier, and wherein the resolution identifier indicates that a requested resolution of the second video stream is the second resolution;

obtaining the resolution identifier; and generating the second video stream based on the first video stream when the first resolution does not match the resolution identifier.

13. The method of claim 8, wherein the video application is a video conferencing application.

14. The method of claim 8, further comprising:

determining a plurality of resolutions supported by the multimedia processing system, wherein the plurality of resolutions comprises the first resolution and the second resolution; and sending, to the second terminal device, the plurality of resolutions.

15. The method of claim 8, wherein the video application is a video livestreaming application.

16. A non-transitory computer program product comprising computer-executable instructions that, when executed by one or more computing devices, cause the one or more computing devices to:

receive, from a first terminal device, a first video stream having a first resolution;

generate, based on the first video stream, a second video stream having a second resolution, wherein the second resolution is greater than the first resolution;

receive, from a second terminal device, a request to access the second video stream, wherein both the first terminal device and the second terminal device access a same video application;

send, in response to the request, the second video stream to the second terminal device;

receive, from a third terminal device, a third video stream;

perform video composition based on the first video stream and the third video stream to obtain a composite video stream;

send, to a fourth terminal device, the composite video stream, receive, from the fourth terminal device, a second video stream composition request, wherein the second video stream composition request comprises indication information of a composition operation and comprises coordinates of a key point, a length, and a width that correspond to a display area of each video stream participating in composition in a video image;

obtain a second control instruction comprising the coordinates; and perform the video composition on the first video stream and the third video stream according to the second control instruction to obtain the composite video stream.

* * * * *